United States Patent
Folsom et al.

(10) Patent No.: US 9,645,989 B2
(45) Date of Patent: May 9, 2017

(54) TECHNIQUES TO GENERATE CUSTOM ELECTRONIC FORMS USING CUSTOM CONTENT

(75) Inventors: Todd C. Folsom, Cary, NC (US); Scott Paul Leslie, Chapel Hill, NC (US)

(73) Assignee: SAS Institute Inc., Cary, NC (US)

(*) Notice: Subject to any disclaimer, the term of this patent is extended or adjusted under 35 U.S.C. 154(b) by 581 days.

(21) Appl. No.: 13/289,295

(22) Filed: Nov. 4, 2011

(65) Prior Publication Data
US 2013/0117652 A1    May 9, 2013

(51) Int. Cl.
*G06F 17/00* (2006.01)
*G06F 17/24* (2006.01)

(52) U.S. Cl.
CPC .................. *G06F 17/243* (2013.01)

(58) Field of Classification Search
CPC ............. G06F 17/2288; G06F 17/3064; G06F 17/243; G06F 17/30011; G06F 17/30867
USPC ................ 715/221, 222, 223, 224, 225, 226
See application file for complete search history.

(56) References Cited

U.S. PATENT DOCUMENTS

| | | | |
|---|---|---|---|
| 6,754,668 B2 | 6/2004 | Noble et al. | |
| 6,859,820 B1 | 2/2005 | Hauduc et al. | |
| 7,444,590 B2* | 10/2008 | Christian et al. | 715/264 |
| 7,607,085 B1* | 10/2009 | Lassesen | 715/264 |
| 7,765,476 B2 | 7/2010 | Maine | |
| 8,055,997 B2* | 11/2011 | Gagnon | 715/222 |
| 8,195,766 B2* | 6/2012 | Lin et al. | 709/219 |
| 8,380,533 B2* | 2/2013 | Reicher et al. | 715/222 |
| 2003/0135358 A1 | 7/2003 | Lissauer et al. | |
| 2004/0039990 A1* | 2/2004 | Bakar et al. | 715/505 |
| 2004/0168132 A1* | 8/2004 | Travieso et al. | 715/536 |
| 2004/0205118 A1* | 10/2004 | Yu | 709/203 |
| 2005/0288920 A1 | 12/2005 | Green et al. | |
| 2009/0158137 A1* | 6/2009 | Ittycheriah | G06F 17/289 715/234 |
| 2009/0276206 A1 | 11/2009 | Fitzpatrick et al. | |
| 2010/0070843 A1 | 3/2010 | Duym | |
| 2010/0138239 A1* | 6/2010 | Reicher et al. | 715/222 |
| 2011/0231754 A1 | 9/2011 | Campbell et al. | |

OTHER PUBLICATIONS

"AppsRules: Form Prompts Translation Utility", Software Version 6.5.5, 2006, 80 pages, LogicalApps, Irvine, CA.

* cited by examiner

*Primary Examiner* — Ariel Mercado

(57) ABSTRACT

Techniques to generate custom electronic forms are described. An apparatus may comprise a logic device and an application having a form manager component. The form manager component may be operative on the logic device to manage one or more forms for a user interface of the application during a run-time mode of the application. The form manager component may have a custom prompt module operative to determine whether an application context interface is available for a dynamic form prompt of a form. The form manager component may determine whether a custom language interface is available for the dynamic form prompt when the application context interface is available. The form manager component may retrieve custom content in a custom presentation language for the dynamic form prompt when the custom language interface is available. Other embodiments are described and claimed.

27 Claims, 18 Drawing Sheets

GUI View 1300

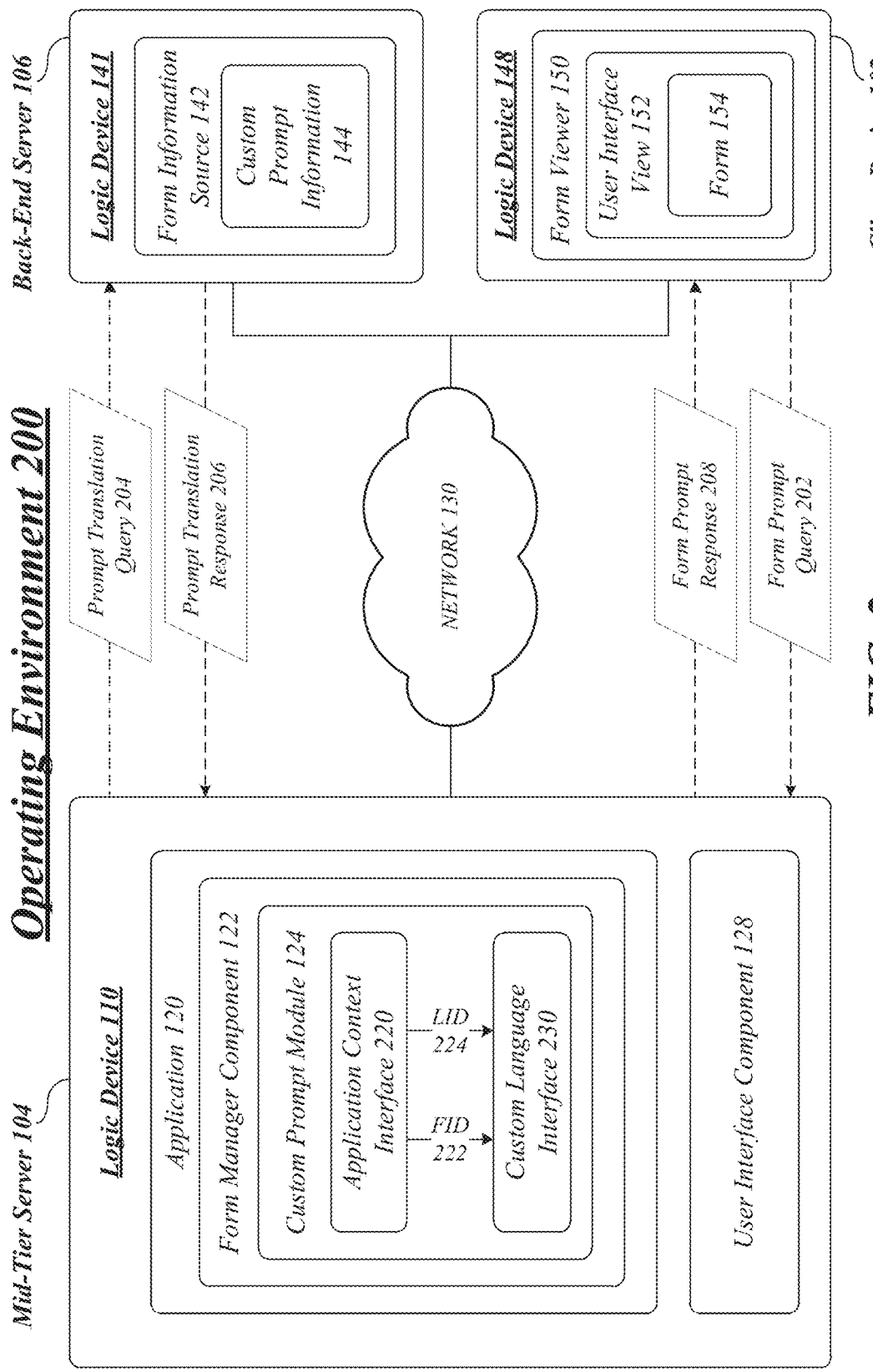

300

RECEIVE BY A PROCESSOR CIRCUIT A REQUEST FOR CUSTOM CONTENT FOR A DYNAMIC FORM PROMPT OF AN ELECTRONIC FORM
302

RETRIEVE CUSTOM CONTENT IN A CUSTOM PRESENTATION LANGUAGE FOR THE DYNAMIC FORM PROMPT FROM CUSTOM PROMPT INFORMATION MANAGED BY A FORM INFORMATION SOURCE
304

PRESENT THE DYNAMIC FORM PROMPT WITH THE CUSTOM CONTENT IN THE CUSTOM PRESENTATION LANGUAGE IN THE FORM ON AN ELECTRONIC DISPLAY
306

PRESENT A STATIC FORM PROMPT WITH STATIC CONTENT IN A STATIC PRESENTATION LANGUAGE IN THE FORM ON THE ELECTRONIC DISPLAY
308

*FIG. 3*

Table 400

| Form Prompt Identifier 402 | Custom Content 404 | Location Identifier 406 | |
|---|---|---|---|
| Name.text | Your name? | English | 412-1 |
| | Votre nom? | French | 412-2 |
| | Su nombre? | Spanish | 412-3 |

Custom Prompt Information 144

Application Context Interface 220

```
interface ApplicationContext {

/** Returns a delegate that may be used as an alternate source for localized
 * text. This text would be
 * provided at run time by the supplied delegate. This method may return null.
 * @return a ResourceBundleDelegate
 */
ResourceBundleDelegate getResourceBundleDelegate();

/** Sets a delegate that can supply localized text for the prompts to use
 *instead of their own stored
 * text. Set a null delegate to stop the use of a previously set delegate.
 * @param delegate
 */
void setResourceBundleDelegate(ResourceBundleDelegate delegate);

/** A place where contexts can clean up resources at the end of the application
 * life cycle.
 * Containers should assure that this method is called at the end of the
 * user's session.
 */
void destroy();
```

*FIG. 5*

Custom Language Interface 230

```
interface ResourceBundleDelegate {
    /** Returns the localized string matching the supplied key, if any.
     * @param key the key for looking up the text
     * @param locale
     * @return the text
     */
    String getText(String key, Locale locale);

/** Use this method to clean up any resources (open database
     * connections, file handles) at the
     * time when the user's session is ending.
     */
    void destroy();
```

*FIG. 6*

XML Document 1500

```xml
<PromptGroup>
    <DefinitionsAndSubgroups>
        <TextDefinition name="ApplicantName" >
            <Label>
                <Text>name.text</Text>
            </Label>
            <Description>
                <Text>nameDesc.text</Text>
            </Description>
        </TextDefinition>                                  }  1502
        <TextDefinition name="Address" >
            <Label>
                <Text>address.text</Text>
            </Label>
            <Description>
                <Text>addressDesc.text</Text>
            </Description>
        </TextDefinition>                                  }  1504
        <TextDefinition name="City" >
            <Label>
                <Text>city.text</Text>
            </Label>
            <Description>
                <Text>cityDesc.text</Text>
            </Description>
        </TextDefinition>                                  }  1506
    </DefinitionsAndSubgroups>
</PromptGroup>
```

FIG. 15

Custom Language Interface 230

```java
public class MyRBD implements ResourceBundleDelegate{

/* A delegate that returns French text or English f the locale is US.
     * @see com.sas.uiconfig.ResourceBundleDelegate#getText.java.lang.String,
java.util.Locale)
     */
    public String getText(String key, Locale locale) {
            f ("name.text".equals(key)){
                    f (Locale.US.equals(locale)) return "Your name?";
                    return "Votre nom?";
            }
            f ("nameDesc.text".equals(key)){
                f (Locale.US.equals(locale))
                return "Give your first name and last name.";
                return "Donnez votre nom et prénom.";
            }                                                              } 1602 f ("address.text".equals(key)){
                f (Locale.US.equals(locale)) return "Your address?";
                return "Votre adresse?";
            }
            f ("addressDesc.text".equals(key)){
                f (Locale.US.equals(locale)) return "Please give your street address.";
                return "S'il vous plaît donner votre adresse de rue.";
            }                                                              } 1604 f ("city.text".equals(key)){
                f (Locale.US.equals(locale)) return "Your city?";
                return "Votre ville?";
            }
            f ("cityDesc.text".equals(key)){
                f (Locale.US.equals(locale)) return "Where do you live?";
                return "Où habitez-vous?";
            }                                                              } 1606
            return null;
    }

/* (non-Javadoc)
     * @see com.sas.uiconfig.ResourceBundleDelegate#destroy()
     */
    public void destroy() {
            //does nothing in this implementation            } 1608
    }
}
```

*FIG. 16*

TECHNIQUES TO GENERATE CUSTOM ELECTRONIC FORMS USING CUSTOM CONTENT

BACKGROUND

A user interface is a system by which people (users) interact with an electronic device, such as a computer. In general, a user interface allows users to input information to manipulate an electronic device. A user interface also allows an electronic device to output information as to the effects of the manipulation. In computing, a graphical user interface (GUI) is a type of user interface that allows users to interact with electronic devices with images rather than text commands. A GUI represents the information and actions available to a user through graphical icons and visual indicators such as secondary notation, as opposed to text-based interfaces, typed command labels or text navigation. The actions are usually performed through direct manipulation of the graphical elements.

An electronic form is a type of GUI view that is specifically designed to allow a user to enter data in a structured manner for processing by an electronic device. An electronic form is an electronic version of a physical form, such as a paper document with blank spaces for insertion of required or requested information. An electronic form provides an input template comprising various combinations of checkboxes, radio buttons, form fields, and other GUI elements designed to query and display data.

Electronic forms are typically designed for use in a particular geographic region. For instance, a form designer might design an electronic form with various GUI elements presenting a series of form fields arranged to accept user information. A form field may have a form prompt proximate to the form field to prompt a user to enter certain types of information in the form field, such as a form prompt "Name" next to a form field for entering a user name. The form labels are typically presented in a human language appropriate for a given geographical region. For instance, an electronic form presented to form users in the United States of America (USA) would use form labels presented in the English language.

A potential problem arises, however, when an electronic form designed for one geographic region is presented in a different geographic region. For instance, if an electronic form originally designed in the English language was to be used in a geographic region other than the USA, such as Korea, an administrator or a developer of an application generating a form would need to manually change form prompts from the English language to the Korean language usually by creating another copy of the form. For business class form generators, a team of language specialists may be employed to "localize" an electronic form for a particular geographic region. This manual process is inefficient, expensive, and raises potential security risks. There are some automated localization techniques, although these techniques are typically limited to use at design time rather than run-time of a form generator. Further, automated techniques are typically limited to performing language translations for a form, which can produce unpredictable results depending on a quality of a translation program or algorithm. It is with respect to these and other considerations that the present improvements are needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

In one embodiment, for example, an apparatus may comprise a logic device and an application having a form manager component. The form manager component may be operative on the logic device to manage one or more forms for a user interface of the application during a run-time mode of the application. The form manager component may have a custom prompt module operative to determine whether an application context interface is available for a dynamic form prompt of a form. The form manager component may determine whether a custom language interface is available for the dynamic form prompt when the application context interface is available. The form manager component may retrieve custom content in a custom presentation language for the dynamic form prompt when the custom language interface is available. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 2 illustrates an embodiment of a custom form generation system in a first operating environment.

FIG. 3 illustrates an embodiment of a first logic flow.

FIG. 4 illustrates an embodiment of a table for a custom form generation system.

FIG. 5 illustrates an embodiment of an application context interface for a custom form generation system.

FIG. 6 illustrates an embodiment of a custom language interface for a custom form generation system.

FIG. 15 illustrates an embodiment of an extensible markup language (XML) document for a custom form generation system.

FIG. 16 illustrates an embodiment of a custom language interface for a custom form generation system.

DETAILED DESCRIPTION

Embodiments are generally directed to enhanced document customization techniques to generate custom electronic documents for an application. Some embodiments are particularly directed to enhanced document customization techniques to automatically generate an electronic document, such as an electronic form, having content in different human languages during run-time of an application based on a location of a user of the electronic document. The content may be stored in local or remote datastores accessible by the application.

In one embodiment, for example, enhanced document customization techniques may generate an electronic form having one or more form fields with associated form prompts. The form prompts can be static form prompts or dynamic form prompts. Static form prompts may present static content in one or more static presentation languages suitable for one or more geographic locations. Static form prompts typically cannot be changed after creation of a form. Dynamic form prompts may present custom content in a custom presentation language suitable for different geographic locations. Dynamic form prompts can be changed after creation of a form. The dynamic form prompts may be generated during run-time of an application generating the electronic form, thereby allowing content for the dynamic form prompts to be constantly changed and updated. The content is typically not translated in real-time, but rather pre-translated content is retrieved and substituted during run-time of an application. In this manner, content for an electronic form may be automatically or programmatically transformed into different human languages suitable for multiple geographies during run-time of the application without manual human intervention. As a result, the embodiments can improve affordability, scalability, modularity, extendibility, or interoperability for an operator, device or network.

Figure 1:
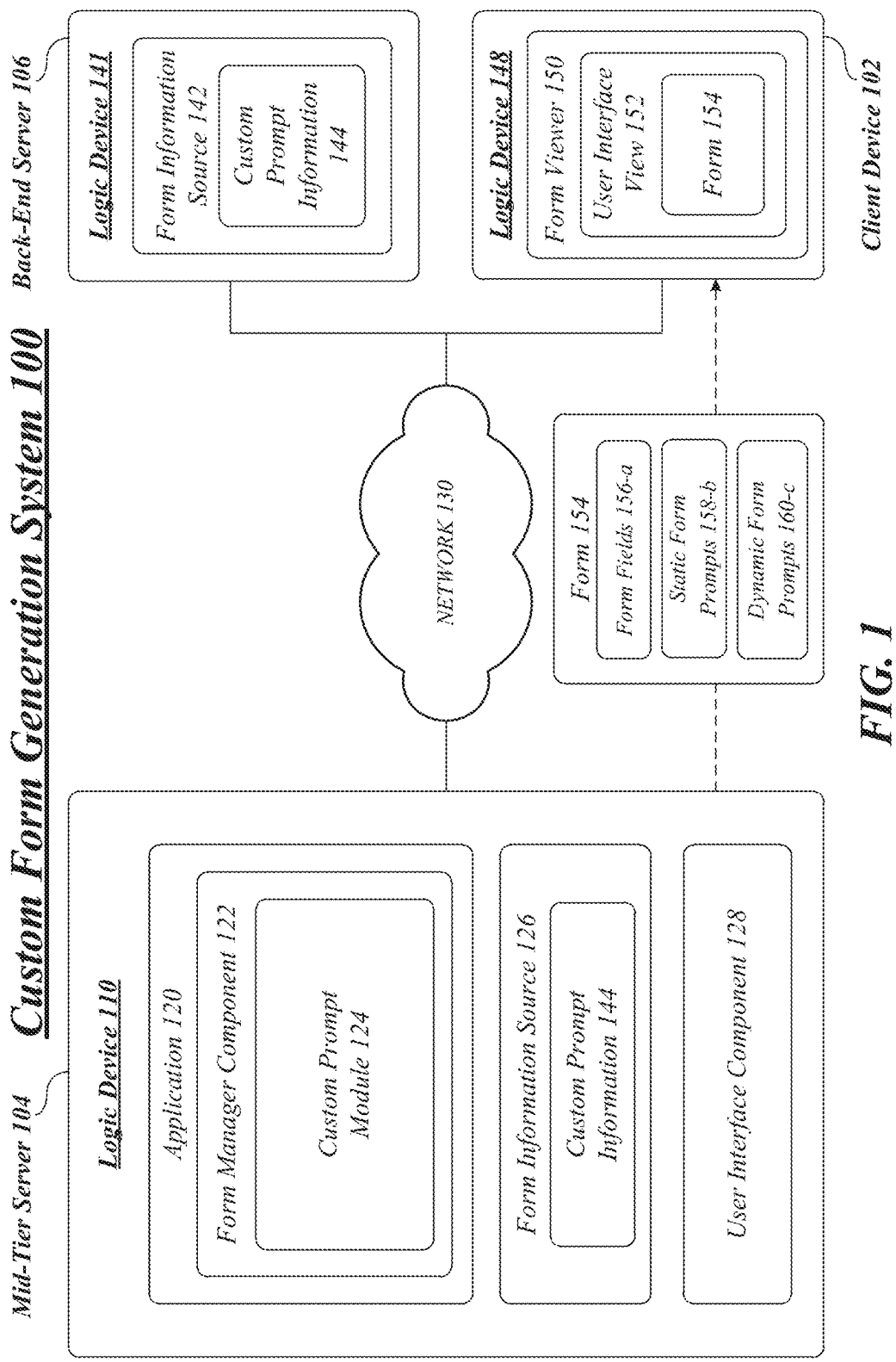
FIG. 1 illustrates an embodiment of a custom form generation system.

FIG. 1 illustrates a block diagram for a custom form generation system 100 designed to implement various enhanced document customization techniques for designing and implementing custom documents for different software programs. The custom form generation system 100 may be implemented as part of a computing system or communications system, examples of which are described in more detail with reference to respective FIGS. 17, 18. Although the custom form generation system 100 as shown in FIG. 1 has a limited number of elements in a certain topology, it may be appreciated that the custom form generation system 100 may include more or less elements in alternate topologies as desired for a given implementation.

In various embodiments, the custom form generation system 100 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

In the illustrated embodiment shown in FIG. 1, the custom form generation system 100 comprises a mid-tier server 104. The mid-tier server 104 may comprise any electronic device capable of executing a defined set of logic using a logic device 110. In one embodiment, the logic device 110 may comprise a processing system. The processing system may comprise, for example, a general purpose processor or a special purpose processor and one or more memory units, as described in more detail with reference to FIGS. 10, 17. The embodiments, however, are not limited in this context.

The mid-tier server 104 includes an application 120. The application 120 may comprise any software program that generally allows a user to accomplish one or more specific tasks. In various implementations, the application 120 may provide a graphical user interface (GUI) either natively or via the user interface component 128 to communicate information between the application 120 and a user via an output device, such as an electronic display. Examples of applications 120 may include without limitation information technology (IT) management applications, human resource management applications, financial management applications, business intelligence applications, customer relationship management applications, report generating applications, statistical analysis applications, business planning applications, project management applications, productivity applications, word processing applications, spreadsheet applications, database applications, and so forth. In one embodiment, for example, the application 120 may be implemented as one or more SAS® software application programs made by SAS Institute Inc., Cary, N.C., such as SAS/Management Console, SAS Information Map Studio, SAS Web Report Studio, Business Intelligence (BI) Dashboard, and so forth. The embodiments, however, are not limited to these examples.

The application 120 may include a form manager component 122. The form manager component 122 may be operative on the logic device 110 to generate, modify, or otherwise manage one or more electronic forms 154 for the application 120. Electronic forms 154 are an exemplary type of electronic document. Although embodiments may perform certain operations using electronic forms 154 as an example of an electronic document, it may be appreciated that the embodiments may perform the same or similar operations using any electronic documents as desired for a given implementation. The embodiments are not limited in this context.

In one embodiment, the form manager component 122 may manage one or more forms 154 of the application 120 during a run-time mode of the application 120. For example, assume an insurance company implements an online web application and web service in the mid-tier server 104 to allow insurance customers to fill-out and complete an electronic accident claims form. The form manager component 122 may store, retrieve, generate and otherwise manage various electronic accident claim forms as an example of the forms 154 on behalf of the web application implemented as the application 120.

A form 154 may be implemented using various GUI elements presented in a GUI view, or portion of a GUI view, that is specifically designed to allow a user to enter user data in a structured manner for processing by the application 120 on the logic device 110. A form 154 may comprise electronic media that provides an input template rendered using various GUI elements, such as checkboxes, radio buttons, text fields, and other GUI elements designed to query, present and receive data for a user. Similar to a paper form, a form 154 may comprise an electronic form implementing some combination of GUI elements arranged in a defined pattern to solicit requested or required information from a user. Each form 154 may be designed for a specific application 120. For instance, if the application 120 is an insurance application, the form 154 may comprise a claims form having questions, formatting, and style options suitable for an insurance customer. If the application 120 is a custom service application for a telecommunications company, the form 154 may comprise a subscriber form having questions, formatting, and style options suitable for a telecommunications subscriber. The type of application 120 and form 154 may vary according to implementation, and the embodiments are not limited in this context.

As shown in FIG. 1, the form manager component 122 may generate one or more forms 154 for the application 120. A form 154 may comprise, among other GUI elements, one or more form fields 156-*a*, static form prompts 158-*b*, and/or dynamic form prompts 160-*c*. It is worthy to note that "a" and "b" and "c" and similar designators as used herein are intended to be variables representing any positive integer. Thus, for example, if an implementation sets a value for a=5, then a complete set of form fields 156-*a* may include form fields 156-1, 156-2, 156-3, 156-4 and 156-5. The embodiments are not limited in this context.

The form 154 may comprise one or more form fields 156-*a* each capable of presenting and/or receiving form values of different data types (e.g., text, numbers, symbols, etc.). A user may enter a form value, or select a form value from a list of form values, to populate a respective form field 156-*a* of the form 154. For instance, a claims form for an insurance application may have a form field 156-1 for a name of a customer, a form field 156-2 for an address of a customer, a form field 156-3 for a contact number for a customer, and so forth. Each form field 156-*a* may have content control to control a data type or formatting of information that can be entered into the form field 156-*a*, such as textual information, numeric information, spacing, symbols, and so forth.

The form 154 may further comprise one or more static form prompts 158-*b* and/or dynamic form prompts 160-*c*. A static form prompt 158-*b* and a dynamic form prompt 160-*c* are similar in that they are both designed to present content to assist a user in entering or selecting a form value for a form field 156-*a*. Using the previous insurance example, a static form prompt 158-1 or a custom form prompt 160-1 associated with a form field 156-1 might have a text string such as "Your name?" to prompt a user to enter her name into the form field 156-1. Further, content for a static form prompt 158-*b* and 160-*c* are similar in that the type of content may comprise any form of multimedia content, including textual information, numeric information, alphanumeric information, symbol information, sign information, graphical information, image information, audio information, video information, tactile information, olfactory information, and other multimedia content. A major difference between content for a static form prompt 158-*b* and a dynamic form prompt 160-*c*, however, is permanence of the content.

A static form prompt 158-*b* may comprise a type of form prompt designed to present static content in a static presentation language. Static content may refer to fixed or unchanging content. During a design phase of a form 154, a form designer may define a static form prompt 158-*b* with static content in the static presentation language that is presented during run-time of the application 120. The static content in the static presentation language remains the same during run-time of the application 120, and does not vary when the form 154 is presented in different geographic locations.

A dynamic form prompt 158-*b* may comprise a type of form prompt designed to present custom content in a custom presentation language. Custom content may refer to dynamic or changing content. During a design phase of a form 154, a form designer may define a key for the dynamic form prompt 160-*c* that corresponds to a resource stored in a database, such as a table. During run-time of the application 120, custom content for the dynamic form prompt 160-*c* may be retrieved from the resource using the key, and the dynamic form prompt 160-*c* may be presented with the custom content. When custom content for a resource changes, either before or after run-time of the application 120, the dynamic form prompt 160-*c* may access and present the updated custom content during run-time of the application 120.

As previously described, a static form prompt 158-*b* for a form 154 is typically designed with static content in a static presentation language appropriate for a given geographical region. For instance, a form 154 designed for presentation to users in the USA would use static form prompts 158-*b* with content presented in the English language. A problem may occur, however, when a form 154 designed for one geographic region is presented in a different geographic region. For instance, if form 154 originally designed in the English language was to be used in a geographic region other than the USA, such as Korea, an administrator or a user of an application generating a form 154 would need to manually change static content for static form prompts 158-*b* from the English language to the Korean language.

To solve these and other problems, the form manager component 122 may implement a custom prompt module 124 arranged to retrieve or generate custom content for dynamic form prompts 160-*c* of a form 154. The custom prompt module 124 may determine whether an application context is available for a form prompt of a form 154, determine whether a custom language is available for the form prompt when the application context is available, and retrieve custom content for the form prompt when the custom language is available. In this manner, a form 154 may be automatically or programmatically transformed into different human languages suitable for multiple geographies during run-time of the application 120 without any manual human intervention.

It is worthy to note that although various embodiments describe the form manager component 122 and the custom prompt module 124 as generating custom content for dynamic form prompts 160-*c* of a form 154, it may be appreciated that the form manager component 122 and the custom prompt module 124 may generate custom content for any configurable content of a form 154 using techniques similar to those described for processing dynamic form prompts 160-*c*. Examples of configurable content may include without limitation a form description, version numbers, metadata, form values for a form field 156-*a*, and any other configurable content of a form 154. The embodiments are not limited in this context.

The custom prompt module 124 may retrieve or generate custom content for dynamic form prompts 160-*c* from a data structure storing custom prompt information 144. Custom prompt information 144 may include different versions of custom content, with each version of custom content comprising a same set of multimedia information such as textual information translated into a different custom presentation language. A custom presentation language may refer to a human language, such as the English language, the French language, the Spanish language, the German language, the Korean language, and other human languages. For instance, an English version of custom content may comprise textual information "Your name?" in the English language may have other versions of custom content such as a French version "Votre nom?" in the French language, a Spanish version "Su nombre?" in the Spanish language, and so forth.

In addition to actual custom content, custom prompt information 144 may include other types of control information useful for retrieving or locating custom content for a dynamic form prompt 160-c. Examples of control information may include without limitation control words, codes, indices, properties, attributes, identifiers, metadata and other information useful in identifying custom content in a custom presentation language for a dynamic form prompt 160-c. The embodiments are not limited in this context.

Custom prompt information 144 may be stored anywhere in the custom form generation system 100, including the client device 102, the mid-tier server 104, the back-end server 106, or another network device accessible by the custom prompt module 124 via the network 130. As shown in FIG. 1, for example, custom prompt information 144 may be provided by a form information source 126 implemented locally with the mid-tier server 104. This implementation may be suitable for stand-alone applications 120, such as productivity applications (e.g., word processor application, spreadsheet application, contact management application, scheduling application, etc.) typically used on a single computer. Additionally or alternatively, custom prompt information 144 may be provided by a form information source 142 implemented remotely in the back-end server 106. This implement may be desirable for large scale commercial business applications, such as a line-of-business (LOB) application for a LOB system. A LOB system generally includes various LOB application programs typically implemented on enterprise hardware platforms for a business entity. LOB application programs are application programs designed to provide various business application services. Examples of LOB application programs may include a Customer Relationship Management (CRM) application program, an Enterprise Resource Planning (ERP) application program, a Supply Chain Management (SCM) application program, Business Intelligence (BI) application program, and other business application programs using business-oriented application logic.

The mid-tier server 104 may further include a user interface component 128. The user interface component 128 may generally provide a user interface, such as a GUI engine, for the application 120. The user interface component 128 may be implemented natively as part of the application 120, or as part of another software program, such as an operating system (OS) or other system program. In one embodiment, the user interface component 128 may be operative on the logic device 110 to generate a user interface view 152 with a form 154 having form fields 156-a, static form prompts 158-b, and/or dynamic form prompts 160-c in the form 154 for presentation on an electronic display.

The mid-tier server 104 may be communicatively coupled to other network devices of the custom form generation system 100 via a network 130, including a client device 102 and a back-end server 106, for example. The network 130 may communicate information between the client device 102, the mid-tier server 104, and the back-end server 106, as well as any other network devices connected to the network 130. The network 130 may comprise any type of private or public network, including packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). Further, the network 130 may be implemented as a wired network, a wireless network, or a combination of both.

When implemented as a wired network, for example, the network 130 may include one or more elements arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a device using an input/output (I/O) adapter. The I/O adapter may be arranged to operate with any suitable technique for controlling information signals between elements using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless network, for example, the network 130 may include one or more wireless elements arranged to communicate information over one or more types of wireless communication media. An example of wireless communication media may include portions of a wireless spectrum, such as the radio-frequency (RF) spectrum. The wireless elements may include components and interfaces suitable for communicating information signals over the designated wireless spectrum, such as one or more antennas, wireless transmitters, receiver, transmitters/receivers ("transceivers"), amplifiers, filters, control logic, antennas, and so forth. The embodiments are not limited in this context.

The mid-tier server 104 may communicate information with one or more back-end servers 106 via the network 130. A back-end server 106 may comprise any electronic device capable of executing a defined set of logic using a logic device 141. In one embodiment, the logic device 141 may comprise a processing system. The processing system may comprise, for example, a general purpose processor or a special purpose processor and one or more memory units, as described in more detail with reference to FIGS. 10, 17. The embodiments, however, are not limited in this context.

The back-end server 106 may comprise or implement one or more form information sources 142. Each of the form information sources 142 may comprise or implement database technologies arranged to store, update, retrieve and/or manage various types of custom prompt information 144, such as a database management system (DBMS) comprising database management software and network storage units. For instance, a form information source 142 may be implemented as a storage area network (SAN).

The back-end server 106 may include one or more form information sources 142 arranged for execution by a logic device 141. The form information source 142 may have one or more sets of custom prompt information 144. During run-time of the application 120, the custom prompt module 124 of the form manager component 122 may retrieve custom content from custom prompt information 144 managed by the form information source 142 of the back-end server 106 via the network 130. The back-end server 106 may implement any number of server technologies to allow such remote access.

In one embodiment, for example, the back-end server 106 may implement a web service to manage and access custom prompt information 144 stored by form information source 142. A web service is any software system designed to support interoperable machine-to-machine (M2M) interaction over the network 130. In one embodiment, the implemented web service has an interface described in a machine-processable format, such as a web services description language (WSDL) format. Other systems interact with the web service in a manner prescribed by its description using simple object access protocol (SOAP) messages, typically conveyed using hypertext transfer protocol (HTTP) with an XML serialization in conjunction with other web-related standards. The web service may use different classes of web services. Two major classes of web services may include representational state transfer (REST)-compliant web services, in which the primary purpose of the service is to manipulate XML representations of web resources using a uniform set of "stateless" operations, and arbitrary web services, in which the service may expose an arbitrary set of operations. The web service may implement web services using a number of different techniques, including without limitation remote procedure call (RPC) techniques, service-oriented architecture (SOA) techniques, and REST techniques. The embodiments are not limited in this context.

The mid-tier server 104 may also communicate information to one or more client devices 102 via the network 130. A client device 102 may comprise any electronic device capable of executing a defined set of logic using a logic device 148. In one embodiment, the logic device 148 may comprise a processing system. The processing system may comprise, for example, a general purpose processor or a special purpose processor and one or more memory units, as described in more detail with reference to FIGS. 10, 17. The embodiments, however, are not limited in this context.

The client device 102 may include a form viewer 150 arranged for execution by the logic device 148. The form viewer 150 may be arranged to present a user interface view 152 with a form 154 having one or more form fields and dynamic form prompts presenting various types of custom prompt information 144. As shown in FIG. 1, the form viewer 150 may comprise a separate stand-alone software program, such as a thin-client application installed on the client device 102. In this case, the form viewer 150 may comprise software executed by the logic device 148 of the client device 102 and capable of presenting a user interface view 152 with a form 154. Additionally or alternatively, the form viewer 150 may comprise software integrated with the application 120 and accessible by the client device 102 via a web browser. In this case, the form viewer 150 may comprise software executed by the logic device 110 of the mid-tier server 104 and capable of generating web pages with a form 154. The embodiments are not limited in this context.

FIG. 2 illustrates an embodiment of an exemplary operating environment 200 for the custom form generation system 100. The operating environment 200 illustrates a set of interfaces to generate dynamic form prompts 160-*c* for a form 154. The operating environment 200 also illustrates a message flow between the various network devices of the custom form generation system 100 to generate dynamic form prompts 160-*c* for a form 154 in a case where custom prompt information 144 is stored and retrieved from the back-end server 106.

As previously described, the custom prompt module 124 may supply custom content for all relevant parts of a form 154, such as a set of dynamic form prompts 160-*c*, to present the form 154 in a language specifically suited to an end-user of the form 154. In the illustrated embodiment shown in FIG. 2, the custom prompt module 124 may comprise or implement an application context interface 220 arranged to establish an application context for a dynamic form prompt 160-*c* of a form 154. The application context interface 220 provides an application context class that allows a form designer to provide a set of translations and store them as custom content in the custom prompt information 144 of the form information source 142. The application context is passed to the custom prompt module 124 where it becomes recursively available to all dynamic form prompts 160-*c* or groups of dynamic form prompts 160-*c* that are part of a form 154.

As shown in FIG. 2, the custom prompt module 124 may include an application context interface 220. In one embodiment, for example, the application context interface 220 may be implemented as an application program interface (API) of the form manager component 122 or the custom prompt module 124. The application context interface 220 may receive a form prompt query 202 from the form viewer 150 arranged to present a form 154. The form prompt query 202 may initiate customization operations to retrieve or generate custom content for dynamic form prompts 160-*c* of the form 154. The application context interface 220 may receive the form prompt query 202, and set or check for presence of a delegate that may be used to retrieve or generate custom content for dynamic form prompts 160-*c* for a form 154. In some cases, prior to setting a new delegate, the application context interface 220 may need to void a previous delegate used to generate a previous dynamic form prompt 160-*c* and/or a previous form 154.

The custom prompt module 124 may further include a custom language interface 230. The custom language interface 230 may comprise an example of a delegate for the application context interface 220. In one embodiment, for example, the custom language interface 230 may be implemented as an application program interface (API) of the form manager component 122 or the custom prompt module 124.

The custom language interface 230 may retrieve custom content for dynamic form prompts 160-*c* using a form prompt identifier 222 and a location identifier 224. The custom language interface 230 may receive a form prompt identifier 222 and a location identifier 224 from the application context interface 220 or the custom prompt module 124 to initiate generation of a dynamic form prompt 160-*c*. The form prompt identifier 222 may uniquely identify a dynamic form prompt 160-*c*. The location identifier 224 may uniquely identify a geographic location and/or a custom presentation language for a geographic location for a dynamic form prompt 160-*c*. For instance, the location identifier 224 may identify an actual human language, such as the English language, or a geographic location that implies an actual human language, such as the USA implying the English language. The custom language interface 230 may use the form prompt identifier 222 and the location identifier 224 to access custom content stored as part of the custom prompt information 144. The custom language interface 230 may then generate or present a dynamic form prompt 160-*c* using the custom content.

The custom language interface 230 may retrieve custom content needed to generate the dynamic form prompts 160-*c* from custom prompt information 144 managed by a form information source 126, 142. The operating environment 200 illustrates a case where the custom language interface 230 retrieves custom content from custom prompt information 144 managed by the form information source 142 implemented by the back-end server 106 using a series of messages communicated via the network 130. In this case, the form information source 142 is operative on a logic device 141 to retrieve the custom content from the custom prompt information 144. However, the custom language interface 230 may also retrieve custom content from custom prompt information 144 managed by the form information source 126 implemented by the mid-tier server 104 using similar messages or signals communicated via a local bus structure or communication fabric of the mid-tier server 104. In this case, the form information source 126 is operative on the logic device 110 to retrieve the custom content from the custom prompt information 144.

The custom language interface 230 may generate a form prompt translation query 204 in response to a form prompt query 202 using information from the form prompt query 202 and/or the application context interface 220. The form prompt query 202 may include, for example, the form prompt identifier 222 and the location identifier 224. The form prompt translation query 204 may include, for example, the form prompt identifier 222 and the location identifier 224 retrieved from the form prompt query 202. Alternatively, form prompt identifiers and location identifiers 224 may be stored and retrieved from a data structure managed by the form manager component 122. The custom language interface 230 may send the form prompt translation query 204 to retrieve custom content from custom prompt information 144 managed by the form information source 142 stored by the back-end server 106.

The back-end server 106 may receive the prompt translation query 204, and the form information source 142 may search for custom content stored as part of the custom prompt information 144 using the form prompt identifier 222 and location identifier 224 retrieved from the prompt translation query 204. Once located, the form information source 142 may send a prompt translation response 206 with the custom content retrieved from the custom prompt information 144 to the mid-tier server 104.

The custom language interface 230 may receive the prompt translation response 206 with the custom content from the form information source 142. The custom content may comprise, for example, a presentation string having one or more signs from a vocabulary of the custom presentation language. The custom language interface 230 may perform any necessary processing of the custom content, such as formatting operations, style operations, data schema conversations, and so forth. The custom language interface 230 may forward the custom content to the form viewer 150 of the client device 102 via a form prompt response 208.

The form viewer 150 may receive the form prompt response 208, retrieve the custom content, and present the dynamic form prompt 160-*c* with the custom content as part of a user interface view 152 on the digital display. The operating environment 200 illustrates a case where the custom language interface 230 sends the custom content to the form viewer 150 implemented by the client device 102 using a series of messages communicated via the network 130. In this case, the form viewer 150 is operative on a logic device 148 to present the form 154 and the dynamic form prompts 160-*c* with the custom content on a digital display. However, the custom language interface 230 may also send the custom content to a form viewer 150 implemented by the mid-tier server 104 using similar messages or signals communicated via a local bus structure or communication fabric of the mid-tier server 104. In this case, the form viewer 150 is operative on the logic device 110 to present the form 154 and the dynamic form prompts 160-*c* with the custom content on a digital display.

The unique custom form generation system 100 provides a robust architecture for presenting and localizing electronic form 154 in that it can handle both static form prompts 158-*b* and dynamic form prompts 160-*c* in varying combinations and conditions. For example, in addition to the above-described exemplary scenarios for dynamic form prompts 160-*c*, in those cases where a form 154 includes only static form prompts 158-*b*, the form viewer 150 may present the form 154 with static content coded for the static form prompts 158-*b*. This allows the form viewer 150 to handle and present any legacy forms 154 of the application 120. In those cases where a form 154 includes both static form prompts 158-*b* and dynamic form prompts 160-*c*, the form viewer 150 may present the form 154 with static content coded for the static form prompts 158-*b* and custom content retrieved for the dynamic form prompts 160-*c*. This may be desired for forms 154 designed for multi-lingual users where one language is known at design time while other languages are dependent on a geographic location. In those cases where a form 154 includes only dynamic form prompts 160-*c*, and resources needed to support dynamic form prompts 160-*c* are missing or unavailable, the form viewer 150 may present the form 154 with default custom content or default static content for the dynamic form prompts 160-*c*. This will allow the form viewer 150 to present a form 154 even with missing or unavailable resources. Examples of missing or unavailable resources may include without limitation a missing or failed custom prompt module 124 for the application 120, an application context interface 220, a custom language interface 230, a form identifier 222, a location identifier 224, a lost message (e.g., messages 202, 204, 206, or 208), a network 130, a network connection for the network 130, a communication component for a device (e.g., devices 102, 104, or 106), and so forth.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

FIG. 3 illustrates one embodiment of a logic flow 300. The logic flow 300 may be representative of some or all of the operations executed by one or more embodiments described herein. For instance, the logic flow 300 may be representative of some or all of the operations executed by the custom form generation system 100 and/or the form manager component 122.

In the illustrated embodiment shown in FIG. 3, the logic flow 300 may receive by a processor circuit a request for custom content for a dynamic form prompt of an electronic form at block 302. For example, the custom prompt module 124 of the form manager component 122 of the application 120 may receive by a processor circuit a request for custom content for a dynamic form prompt 160-1 of an electronic form.

The logic flow 300 may retrieve custom content in a custom presentation language for the dynamic form prompt from custom prompt information managed by a form information source at block 304. For example, the custom prompt module 124 may retrieve custom content in a custom presentation language for the dynamic form prompt 160-1 from custom prompt information 144 managed by a form information source 126, 142.

The logic flow 300 may present the dynamic form prompt with the custom content in the custom presentation language in the form on an electronic display at block 306. For example, the custom prompt module 124 may send the custom content to the form viewer 150, and the form viewer 150 may present the dynamic form prompt with the custom content in the custom presentation language in the form 154 on an electronic display of the client device 102.

Additionally or alternatively, the logic flow 300 may present a static form prompt 158-1 with static content in a static presentation language in the form 154 on the electronic display. For example, the form viewer 150 may present both the static form prompt 158-1 with static content in a static presentation language and the dynamic form prompt 160-1 in the same form 154 on the electronic display, thereby allowing the form 154 to present multiple types of prompt information.

FIG. 4 illustrates an embodiment of a table 400 for a custom form generation system 100. The table 400 may provide an example of a data structure to store custom prompt information 144. The table 400 may be created by a form developer before execution of the application 120, and accessed by the form manager component 122 during run-time of the application 120 to dynamically create dynamic form prompts 160-c. The table 400 may also be generated or modified during run-time of the application 120. The table 400 may be stored and/or managed by one or both of the form information sources 126, 142.

As shown in FIG. 4, the table 400 may include a first column for a form prompt identifier 402 (sometimes referred to as a "prompt key"), a second column for a set of custom content 404, and a third column for a location identifier 406. The form prompt identifier 402 corresponds to the form prompt identifier 222 and is used to index the table 400. The content 402 is a translation of content in a given language as identified by the location identifier 406. The location identifier 406 corresponds to the location identifier 224, and indicates a custom presentation language for a given geographic location.

When a form information source 142 (or 126) receives the prompt translation query 204, the form information source 142 may retrieve an embedded form prompt identifier 222 and location identifier 224 for a dynamic form prompt 160-c, such as a dynamic form prompt 160-1. The form information source 142 may search the table 400 for a form prompt identifier 402 that matches the form prompt identifier 222. For instance, as shown in FIG. 4, assume the form prompt identifier 222 is "name.text." The form information source 142 may search and locate a row 410-1 having a form prompt identifier 402 of "name.text." The form information source 142 may then use the location identifier 224 to search column 412-3 for a matching location identifier 406. For instance, as shown in FIG. 4, assume the location identifier 224 is "French." The form information source 142 may search and locate a row 410-2 in the column 412-3 having a location identifier 406 of "French." The form information source 142 may then retrieve the custom content 404 of row 410-2, which in this example is "Votre nom." The form information source 142 may return the custom content 404 in a prompt translation response 206 to the prompt translation query 204.

FIG. 5 illustrates an embodiment of an exemplary application context interface 220 for the custom form generation system 100. The illustrated embodiment shown in FIG. 5 shows exemplary computer program code suitable for implementing an application context interface 220. As shown, the application context interface 220 is coded in the Java programming language for which form developers can provide a concrete implementation class, although other programming languages may be used as well.

One purpose of the application context interface 220 is to let the application 120 provide some context to the form manager component 122 embedded in the application 120. The application context interface 220 provides for setting and getting a custom language interface 230, referred to in the example as a ResourceBundleDelegate interface. The form manager component 122 may take a form designer's implementation of the ResourceBundleDelegate interface and set it on the application context interface 220. The application 120 and/or the form manager component 122 should set the application context on a well-known object so that the form manager component 122 can automatically obtain it. In one embodiment, for example, the form manager component 122 looks on the Java ServletContext object. However, using the ServletContext object is merely by way of example and not limitation. Other objects can be used as well, and the embodiments are not limited in this context.

FIG. 6 illustrates an embodiment of an exemplary custom language interface 230 for the custom form generation system 100. The illustrated embodiment shown in FIG. 6 shows exemplary computer program code suitable for implementing a custom language interface 230. As shown, the custom language interface 230 is coded in the Java programming language, although other languages can be used as well.

The custom language interface 230 implements an interface referred to in FIG. 6 as a ResourceBundleDelegate interface. The ResourceBundleDelegate interface includes a getText method to accept a String key and a Java Locale class. The String key is an implementation for the form prompt identifier 222. The Java Locale class is an implementation for the location identifier 224. Using these two inputs, the getText method returns localized text (e.g., custom content 404) corresponding to the String key (e.g., form prompt identifier 222).

The custom language interface 230 also implements a destroy method. The destroy method is an optional feature that allows for life cycle management of resources used in the concrete implementation. When included as part of the custom language interface 230, the form manager component 122 can be certain that the destroy method will be called after a dynamic form prompt 160-c has been generated. The destroy method can then do clean-up of resources such as closing databases or file handles.

Figure 7:
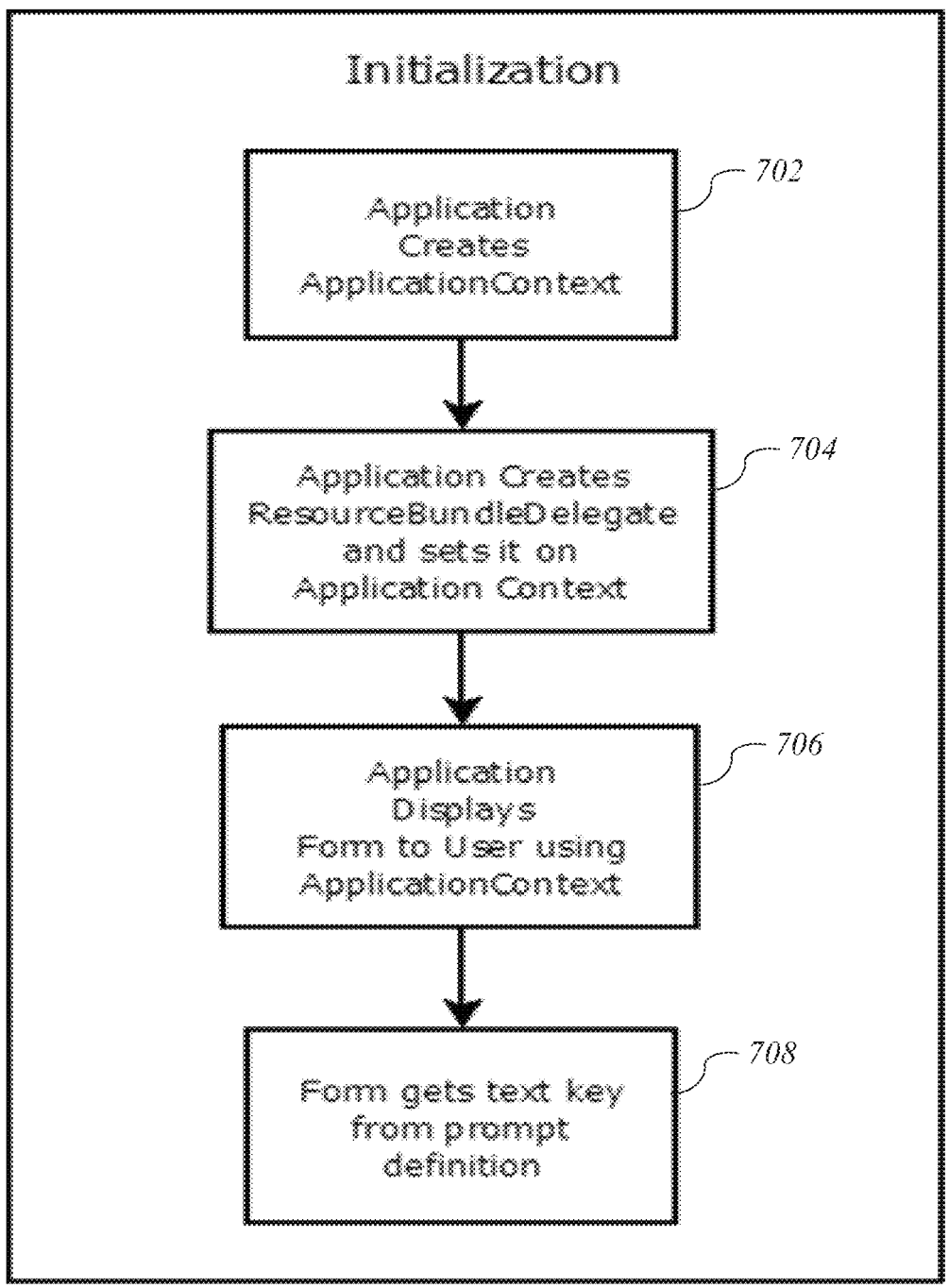
FIG. 7 illustrates an embodiment of a second logic flow.

FIG. 7 illustrates an embodiment of a logic flow 700. The logic flow 700 may be representative of some or all of the operations executed by one or more embodiments described herein. For instance, the logic flow 700 may be representative of some or all of the operations executed by the custom form generation system 100 and/or the application 120 to initialize the form manager component 122.

The dynamic form prompts 160-c that make up a form 154 may be organized into logical groups, and logical groups can have an indefinite number of subgroups. Each group can have an indefinite number of dynamic form prompts 160-c. This supports creation of rather complex forms. To make them ready for use in a user interface view 152, dynamic form prompts 160-c and groups of dynamic form prompts 160-c are loaded from a persistence format of extensible markup language (XML). At the time of loading, the form manager component 122 injects the application context recursively into all prompts. Thus all dynamic form prompts 160-c have access to the application context. This process is demonstrated in the logic flow 700.

In the illustrated embodiment shown in FIG. 7, the logic flow 700 begins when the application 120 creates an application context interface 220 for the form manager component 122 at block 702. The application 120 creates a custom language interface 230 called ResourceBundleDele gate and sets it on the application context interface 220 at block 704. The application 120 displays a form 154 via the form viewer 150 to a user using the application context interface 220 at block 706. The form 154 gets form prompt identifiers 222 for the dynamic form prompts 160-c of the form 154 from a form prompt definition at block 708. The form manager component 122 is now ready to generate a form 154 with custom content for one or more dynamic form prompts 160-c.

Figure 8:
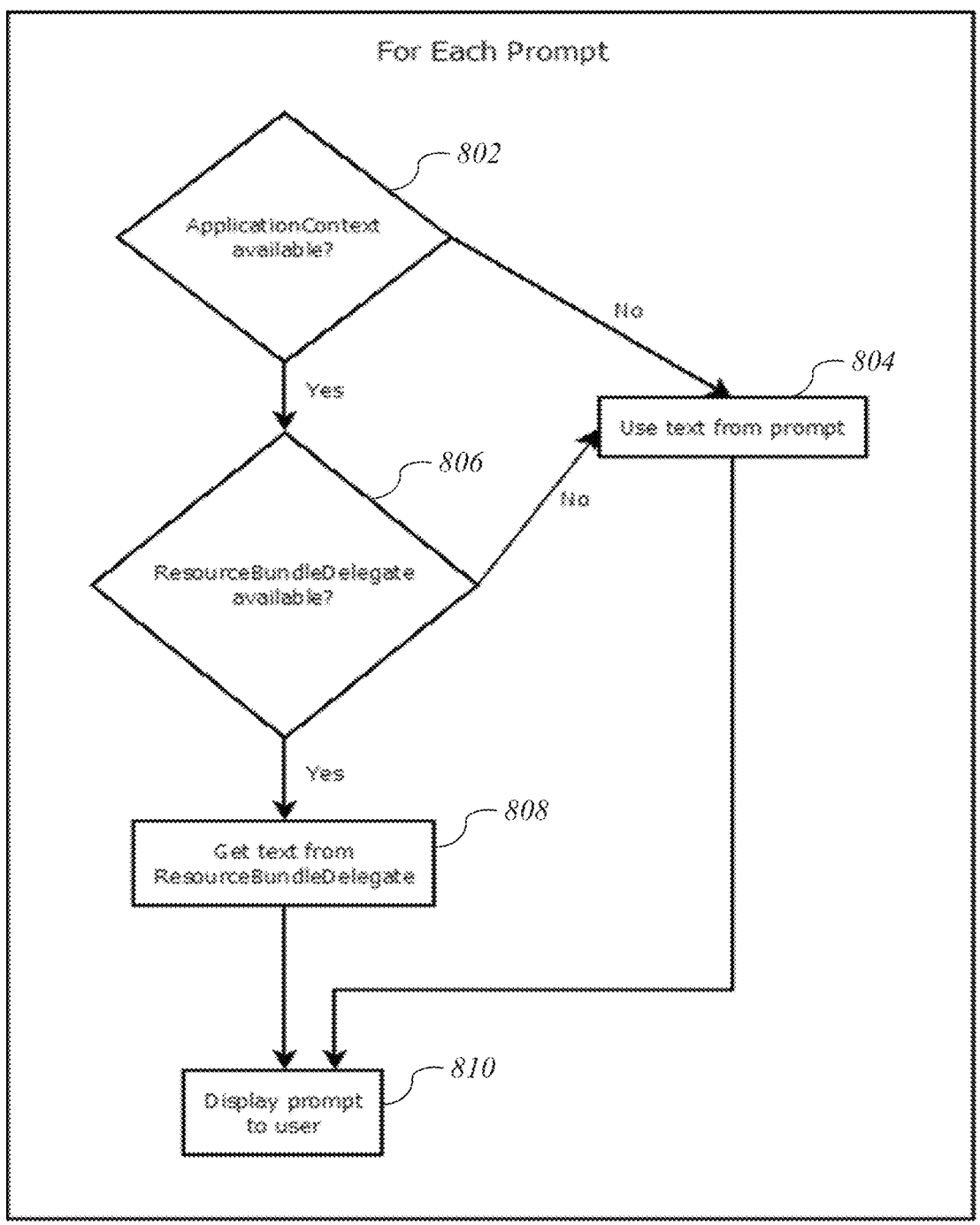
FIG. 8 illustrates an embodiment of a third logic flow.

FIG. 8 illustrates an embodiment of a logic flow 800. The logic flow 800 may be representative of some or all of the operations executed by one or more embodiments described herein. For instance, the logic flow 800 may be representative of some or all of the operations executed by the custom form generation system 100, the application 120, and/or the form manager component 122 to generate dynamic form prompts 160-c for a form 154.

To display dynamic form prompts 160-c in a form 154 shown as part of a user interface view 152, calls are made from the form 154 to get custom content for each dynamic form prompt 160-c. As shown in logic flow 800, the form manager component 122 determines whether an application context interface 220 is available for a dynamic form prompt 160-1 at diamond 802.1f an application context interface 220 is not available, then default content for the dynamic form prompt 160-c is used at block 804, and the dynamic form prompt 160-1 with the default content is presented in the form 154 to a user at block 810. However, if an application context interface 220 is available, then the form manager component 122 calls the custom language interface 230 (e.g., getResourceBundleDelegate method) on the application context interface 220 to determine whether the custom language interface 230 is available at diamond 806. If the application context interface 220 returns a null value indicating a ResourceBundleDelegate is not available, then default content for the dynamic form prompt 160-1 is used at block 804, and the dynamic form prompt 160-1 with the default content is presented in the form 154 to a user at block 810. However, if the application context interface 220 returns a ResourceBundleDelegate indicating the custom language interface 230 is available, the form manager component 122 calls the getText method on the ResourceBundleDelegate. The form manager component 122 and/or the application context interface 220 passes in a form prompt identifier 222 (e.g., a String key parameter) and a location identifier 224 (e.g., a Locale parameter) to retrieve appropriate custom prompt information 144 from a form information source 126, 142 at block 808. The form manager component 122 uses the custom content 404 for the dynamic form prompt 160-1 at block 810. The logic flow 800 may then be repeated for a next dynamic form prompt 160-2 of the form 154. This logic may be repeated until custom content 404 has been retrieved for all the dynamic form prompts 160-c (or other localizable content) of the form 154.

The logic flow 800, or a similar process as the logic flow 800, may be implemented to process static form prompts 158-b as well. In this case, where there is no application context interface 230 or custom language interface 230 (e.g., a ResourceBundleDelegate) available for a static form prompt 158-1 at diamonds 802 or 806, then the form manager component 122 retrieves static content for the static form prompt 158-1 at block 804, and presents the static form prompt 158-1 with the static content in the form 154 at block 810. This process may be repeated for static form prompt 158-2, 158-3 . . . 158-b until all static form prompts 158-b for an electronic form 154 have been processed. In this manner, the logic flow 800 may process both static form prompts 158-b and dynamic form prompts 160-c in a single logic flow.

Figure 9:
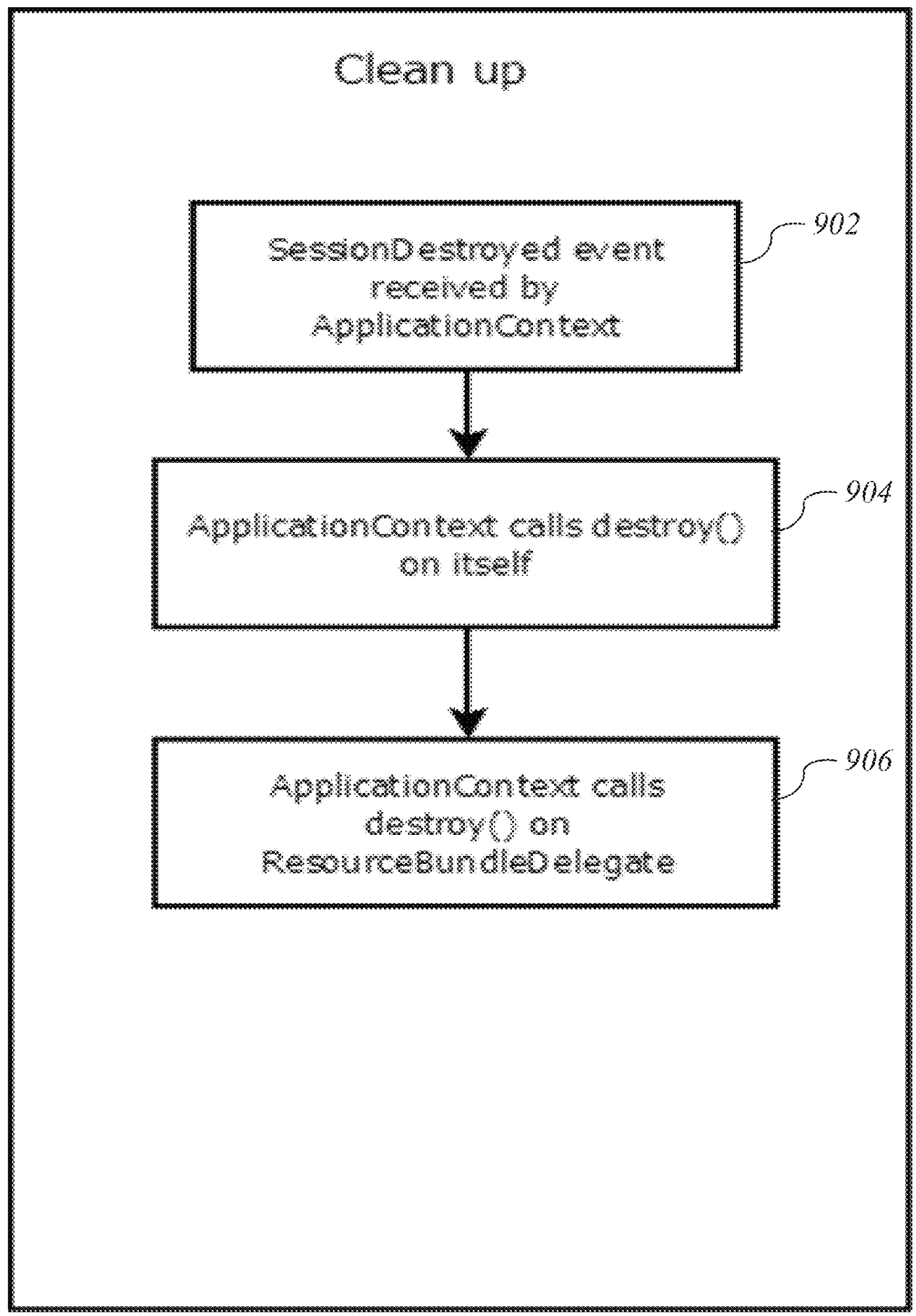
FIG. 9 illustrates an embodiment of a fourth logic flow.

FIG. 9 illustrates an embodiment of a logic flow 900. The logic flow 900 may be representative of some or all of the operations executed by one or more embodiments described herein. For instance, the logic flow 900 may be representative of some or all of the operations executed by the custom form generation system 100, the application 120, and/or the form manager component 122 to release resources after dynamic form prompts 160-c are generated for an electronic form 154.

As previously described, the custom language interface 230 as described with reference to FIG. 6 also implements a destroy method. The destroy method is an optional feature that allows for life cycle management of resources used in the concrete implementation. When included as part of the custom language interface 230, the form manager component 122 can be certain that the destroy method will be called after a dynamic form prompt 160-c has been generated. The destroy method can then do clean-up of resources such as closing databases or file handles. This process may be demonstrated by the logic flow 900.

In the illustrated embodiment shown in FIG. 9, the logic flow 900 may begin when the application context interface 220 receives a SessionDestroyed event indicating a session for a form 154 has been terminated at block 902. When a user terminates a session or it times out, the application context interface 220 will be automatically notified by existing behavior of the Java HttpSession or the Adobe Flex session objects because the application context interface 220 is programmed to listen for this type of event. When this occurs, the application context interface 220 calls a destroy method on itself at block 904. The application context interface 220 then calls a destroy method on the custom language interface 230 at block 906. The delegate implementation provided by a form designer will now be able to clean up any resources and do an orderly shutdown of operations.

The architecture of a custom prompt module 124 having an application context interface 220 and a custom language interface 230 allows a form manager component 122 to process both a set of electronic forms 154 that need localization and a set of electronic forms 154 (legacy forms) that do not need localization or do not have resources for localization. For those use scenarios where a form designer does not need localization, the form designer would design a form 154 with static form prompts 158-b without a form prompt identifier 222, and the static form prompts 158-b would simply return that text. For example, the form designer could provide a static form prompt 158-1 with static content such as "Your name?" without a custom language interface 230 for the static form prompt 158-1, and the static form prompt 158-1 would simply display the text string "Your name?" as the static form prompt 158-1. This technique does not burden form designers with the complexity of localization when they do not need or want localization services.

However, when a form designer does need localization services, the form designer may create dynamic form prompts 160-c using a form prompt identifier 222 matching a form prompt identifier 402 in the table 400 of the custom prompt information 144. For example, if a form prompt identifier 222 is "name.text," then "name.text" will be passed to the form information source 142 to match it with a form prompt identifier 402 in the table 400 of the custom prompt information 144. In our previous example, the form information source 142 could return custom content 404 of "Your name?" for a match of intersection 410-2, 412-1 in table 400 in an English language, or "Votre nom?" for a match of intersection 410-2, 412-2 in table 400 in a French language. By checking for the presence of the application context interface 220 and the custom language interface 230, the custom prompt module 124 will use custom content 404 for a dynamic form prompt 160-c if present, or continue with its original behavior if not.

Figure 10:
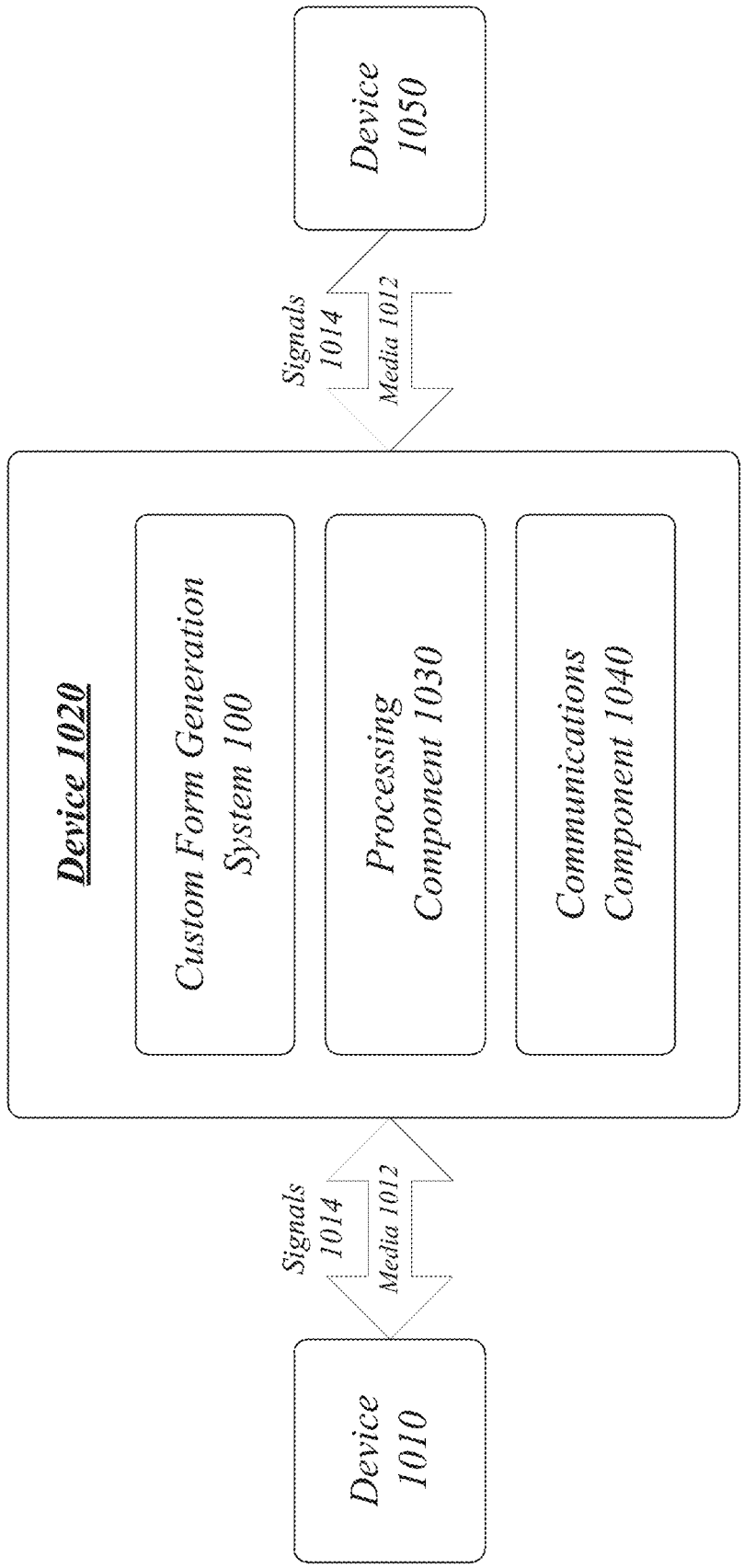
FIG. 10 illustrates an embodiment of a centralized system implementing a custom form generation system.

FIG. 10 illustrates a block diagram of a centralized system 1000. The centralized system 1000 may implement some or all of the structure and/or operations for the custom form generation system 100 in a single computing entity, such as entirely within a single device 1020. For instance, the device 1020 may implement some or all of the structure and features of the client device 102, the mid-tier server 104 and/or the back-end server 106 of the custom form generation system 100 in a single device 1020.

The device 1020 may execute processing operations or logic for the custom form generation system 100 as previously described using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1020 may execute communications operations or logic for the custom form generation system 100 as previously described using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1020 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media 1020.

The device 1020 may communicate with other devices 1010, 1050 over a communications media 1012 using communications signals 1014 via the communications component 1040. For instance, assume the logic device 110, the application 120, the form manager component 122, the custom prompt module 124, the application context interface 220, the custom language interface 230, the form information source 126, the custom prompt information 144, the user interface component 128, and the form viewer 150 are all implemented by a server or server array using web technologies, such as web applications and web services, as part of a cloud computing framework. For instance, the application 120 may comprise a SAS software application such as BI software or statistical analysis software implemented as a hosted application by a server of a server array represented by the device 1020.

The devices 1010, 1050 may comprise fixed or mobile electronic devices, such as smart phones or tablet computers, accessing the computer device 1020 to execute and manipulate the application 120 and the form manager component 122, including generating and populating a form 154. The devices 1010, 1050 may access applications and services using a web browser, a thin-client application interoperable with the application 120, a web gadget, a web part, a web application, or other client software suitable for accessing cloud computing applications and services. Information may be communicated between the devices 1010, 1020, 1050 as communications signals 1014 via communications media 1012 (e.g., part of network 130).

In various embodiments, the devices 1010, 1020, and 1050 may comprise or be implemented as electronic devices each having computing and/or communications capabilities provided by exemplary processing component 1030 and communications component 1040, respectively. Example electronic devices may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a mainframe computer, a supercomputer, a network appliance, a web appliance, multiprocessor systems, processor-based systems, or any combination thereof. The embodiments are not limited in this context.

In various embodiments, components and/or modules of the custom form generation system 100, and any electronic devices implementing some or all of the components and/or modules of the custom form generation system 100, such as the client device 102, the mid-tier server 104, the back-end server 106, the device 1010, the device 1020, and the device 1050, may be communicatively coupled via various types of communications media 1012 as indicated by various lines, arrows, or clouds. The devices, components and/or modules may coordinate operations between each other. The coordination may involve the uni-directional or bi-directional exchange of information. For instance, the devices, components and/or modules may communicate information in the form of signals 1014 communicated over the communications media 1012. The information can be implemented as signals 1014 allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network 130.

Figure 11:
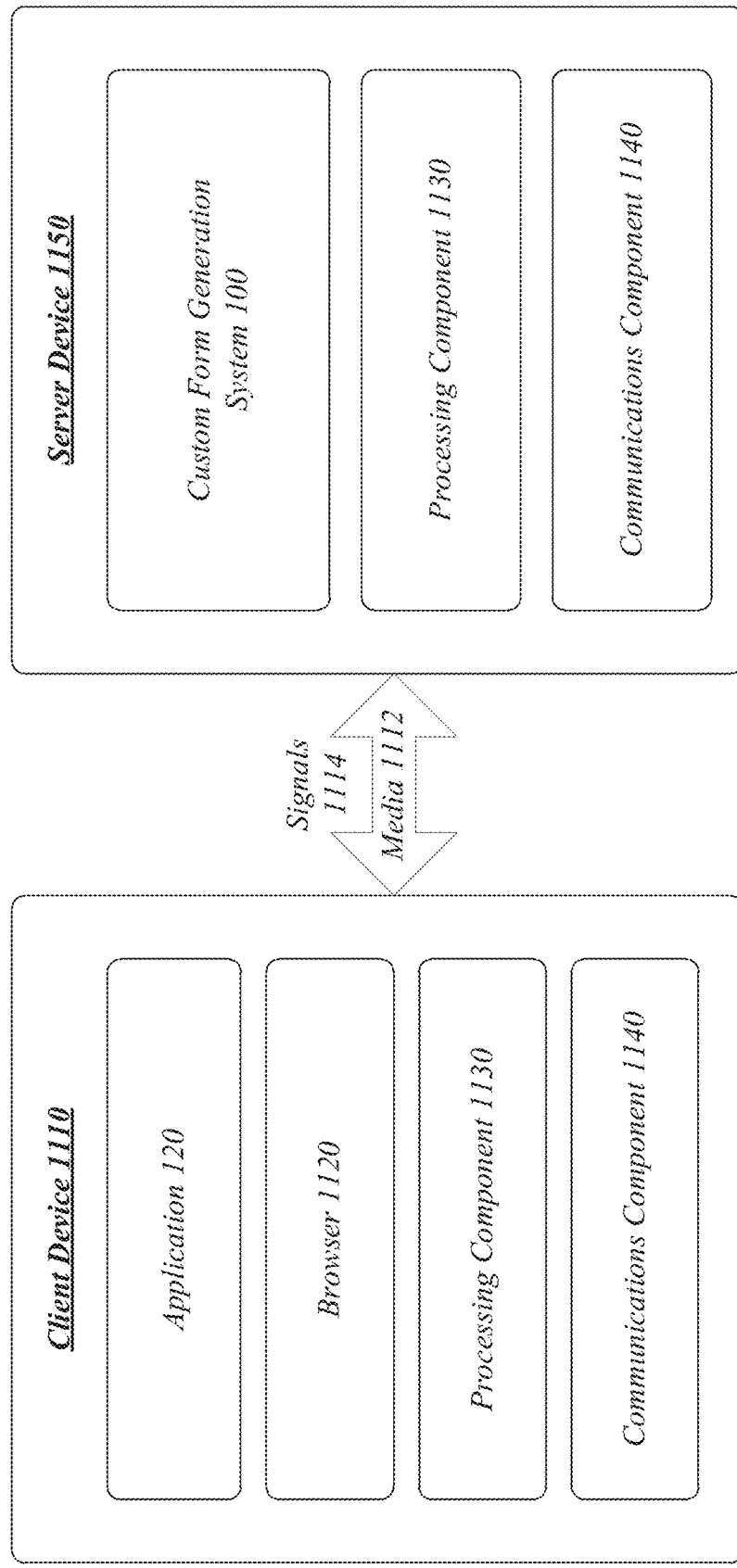
FIG. 11 illustrates an embodiment of a distributed system implementing a custom form generation system.

FIG. 11 illustrates a block diagram of a distributed system 1100. The distributed system 1100 may distribute portions of the structure and/or operations for the custom form generation system 100 across multiple computing entities.

In various embodiments, the custom form generation system 100 may be implemented as part of a distributed system 1100. A distributed system 1100 typically comprises multiple autonomous computers that communicate through a computer network, such as network 130. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include without limitation a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system 1100 when describing various enhanced document customization techniques, it may be appreciated that the enhanced document customization techniques may be implemented by a single computing device as well. The embodiments are not limited in this context.

The client device 1110 and the server device 1150 may process information using the processing components 1130, which are similar to the processing component 1030 described with reference to FIG. 10. The client device 1110 and the server device 1150 may communicate with each over a communications media 1112 using communications signals 1114 via communications components 1140, which are similar to the communications component 1040 described with reference to FIG. 10.

In one embodiment, for example, the distributed system 1100 may be implemented as a client-server system. A client device 1110 may implement the application 120 of the custom form generation system 100, a browser 1120, a processing component 1130, and a communications component 1140. A server device 1150 may implement all other software components and modules of the custom form generation system 100, as well as a processing component 1130 and a communications component 1140.

In various embodiments, the client device 1110 may comprise or employ one or more client computing devices and/or client programs that operate to perform various methodologies in accordance with the described embodiments. For instance, assume the logic device 110 and the application 120 are implemented by a client device 1110, such as a smart phone, hand held computer, or tablet computer. In this case, the application 120 may comprise a SAS software application such as BI software or statistical analysis software implemented as a client application on the client device 1110. The client device 1110 may execute and manipulate the application 120 via local input/output (I/O) devices attached to the client device 1110 (e.g., a keyboard, touchscreen display, mouse, pointing device, etc.).

In various embodiments, the server device 1150 may comprise or employ one or more server computing devices and/or server programs that operate to perform various methodologies in accordance with the described embodiments. For example, when installed and/or deployed, a server program may support one or more server roles of the server computing device for providing certain services and features. Exemplary server systems 1150 may include, for example, stand-alone and enterprise-class server computers operating a server OS such as a MICROSOFT® OS, a UNIX® OS, a LINUX® OS, or other suitable server-based OS. Exemplary server programs may include, for example, communications server programs for managing incoming and outgoing messages, messaging server programs for providing unified messaging (UM) for e-mail, voicemail, VoIP, instant messaging (IM), group IM, enhanced presence, and audio-video conferencing, and/or other types of programs, applications, or services in accordance with the described embodiments. In one embodiment, the server device 1150 may implement a web services framework for hosting form generating services of the dynamic form prompt system 100 as implemented by the server device 1150. For instance, the server device 1150 may implement the form manager component 122, the custom prompt module 124, the application context interface 220, the custom language interface 230, the form information source 126, the custom prompt information 144, the user interface component 128, and the form viewer 150.

When the application 120 needs to generate or access a form 154, the client device 1110 may establish a network connection with the server device 1150 over communications media 1112 using signals 1114 to access the form generating services provided by the server device 1150. For example, the application 120 may communicate a request to the form manager component 120 over a network connection between devices 1110, 1150. The form manager component 120 may use the custom prompt module 124 to populate a form 154 with dynamic form prompts 160-c using custom prompt information 144 stored by the server device 1150. Additionally or alternatively, the client device 1110 may access the form generating services hosted by the server device 1150 via the browser 1120. The browser 1120 may render a form 154 as a web page, such as a hypertext markup language (HTML) or extensible markup language (XML) document, and use web browsing technology to populate the form 154 with dynamic form prompts 160-c.

Figure 12:
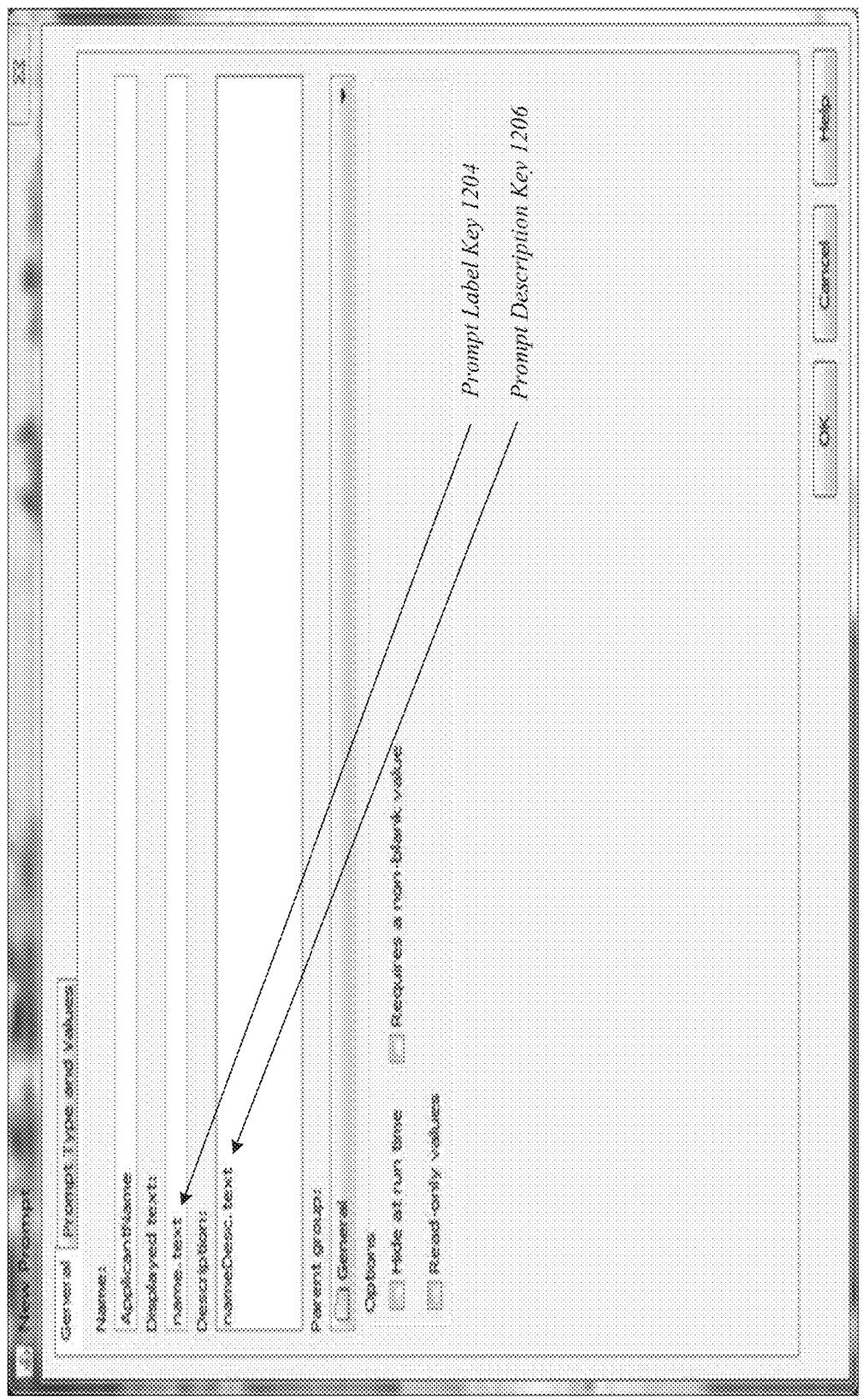
FIG. 12 illustrates an embodiment of a first graphical user interface (GUI) view for a custom form generation system.

FIG. 12 illustrates an embodiment of a GUI view 1200 for the custom form generation system 100. The GUI view 1200 may illustrate GUI elements to allow a form designer to configure a dynamic form prompt 160-c for a form 154. The dynamic form prompt 160-c is for a form 154 that prompts for an applicant's name and address.

As shown in the GUI view 1200, a form designer can enter into a field labeled "Name:" a prompt name as a convenient identifier. The form designer can next enter into a field labeled "Displayed text:" a prompt label key 1204, which in this case is a key "name.text." The form designer can enter into a field labeled "Description:" a prompt description key 1206, which in this case is "nameDesc.text." Each of the keys 1204, 1206 may serve as form prompt identifiers 222 to retrieve associated custom content 404. This illustrates a case where a single dynamic form prompt 160-1 can use multiple keys 1204, 1206 to retrieve different types of custom content 404 for multiple areas of localized text, such as a prompt label, a prompt description, a list of prompt values from which to select for a form field 156-1 corresponding to the dynamic form prompt 160-1, and other localized text. The embodiments are not limited in this context.

Once configured, the dynamic form prompt 160-1 can take advantage of runtime localization. Since the information entered for the dynamic form prompt 160-1 are keys rather than human-readable text strings, the dynamic form prompt 160-1 may present custom content 404 as human-readable text strings in a custom presentation language as returned from the custom language interface 230 at run-time of the application 120. Which particular custom content 404 may be determined based on a geographical location as indicated by a location identifier 224.

Figure 13:
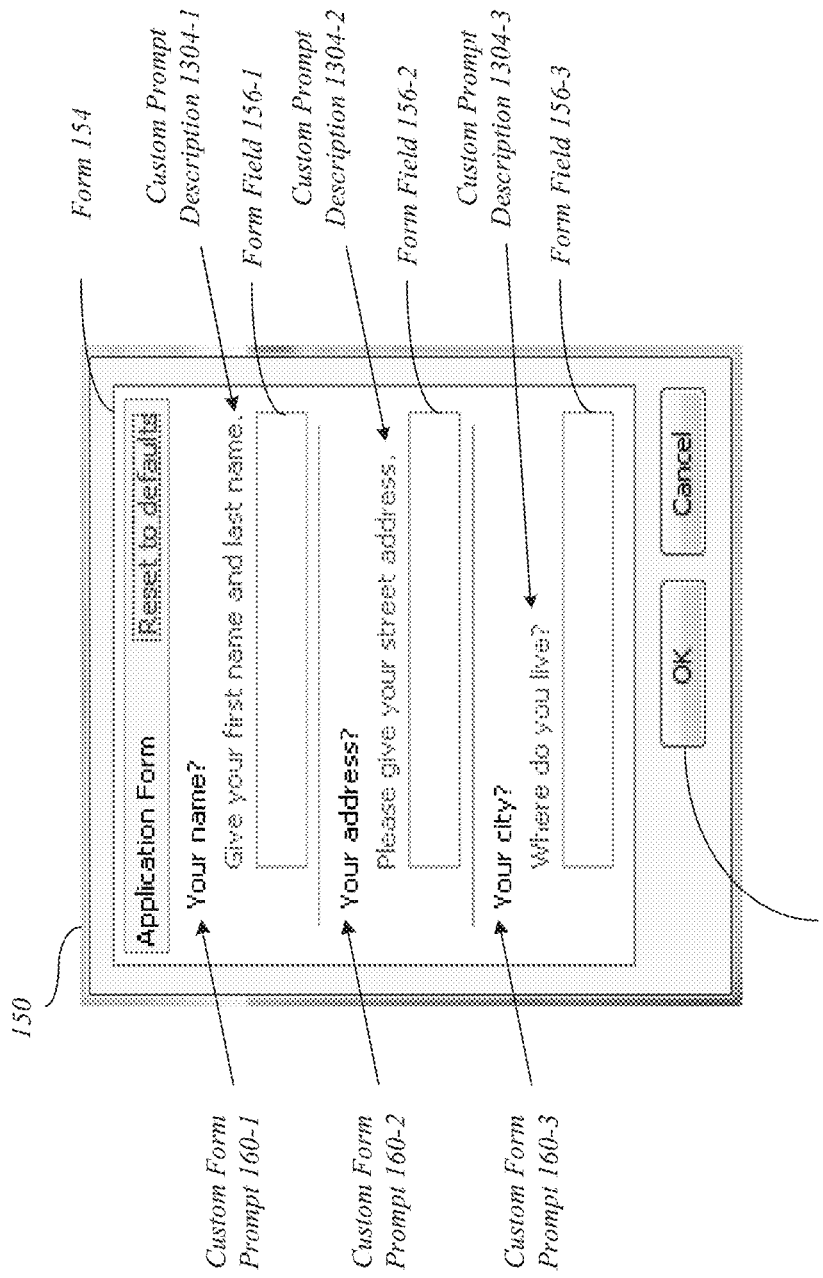
FIG. 13 illustrates an embodiment of a second GUI view for a custom form generation system with a first human language.

FIG. 13 illustrates an embodiment of a GUI view 1300 for the custom form generation system 100 using a first human language for a first geographic location. The GUI view 1300 may illustrate an instantiation of a form viewer 150 to present an electronic form 154. The form 154 may comprise three dynamic form prompts 160-1, 160-2 and 160-3, each with custom content 404 for a geographic location USA that utilizes the English language. As shown in the GUI view 1300, the form 154 may comprise a dynamic form prompt 160-1 with a localized text string "Your name?" to prompt a user to enter her name into a form field 156-1. The form 154 may comprise a dynamic form prompt 160-2 with a localized text string "Your address?" to prompt a user to enter her address into a form field 156-2. The form 154 may comprise a dynamic form prompt 160-3 with a localized text string "Your city?" to prompt a user to enter her city into a form field 156-3.

The form 154 may further comprise other types of dynamic content, such as one or more dynamic prompt descriptions 1304-p. The dynamic prompt descriptions 1304-p may present custom content 404 for a geographic location using techniques similar to those described with respect to dynamic form prompts 160-c. As shown in the GUI view 1300, for example, the form 154 may include three dynamic prompt descriptions 1304-1, 1304-2 and 1304-3, each with custom content 404 for a geographic location USA that utilizes the English language. As shown in the GUI view 1300, the form 154 may comprise a dynamic prompt description 1304-1 with a localized text string "Give your first name and last name." to provide a more detailed description for custom form prompt 160-1 to assist a user in entering her name into a form field 156-1. The form 154 may comprise a dynamic prompt description 1304-2 with a localized text string "Please give your street address." to provide a more detailed description for custom form prompt 160-2 to assist a user in entering her address into a form field 156-2. The form 154 may comprise a dynamic prompt description 1304-3 with a localized text string "Where do you live?" to provide a more detailed description for custom form prompt 160-3 to assist a user in entering her city into a form field 156-3.

Once the user enters her information, the user may select the control button 1302 labeled "OK" to complete the form 154. The completed form 154 may then be processed using conventional techniques.

Figure 14:
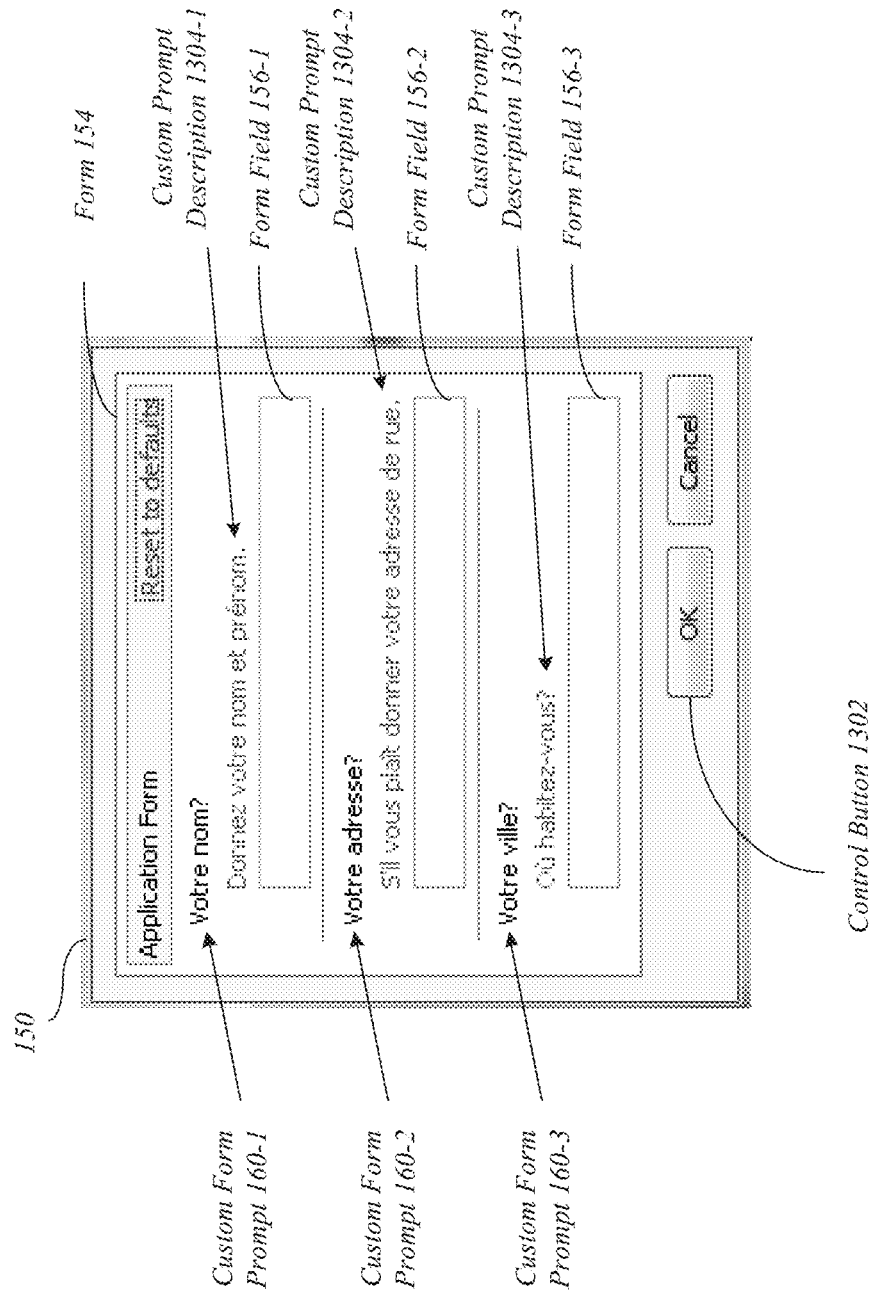
FIG. 14 illustrates an embodiment of a third GUI view for a custom form generation system with a second human language replacing a first human language.

FIG. 14 illustrates an embodiment of a GUI view 1400 for the custom form generation system 100 using a second human language for a second geographic location that replaces the first human language used in the GUI view 1300. The GUI view 1400 may illustrate an instantiation of a form viewer 150 to present an electronic form 154. As with the GUI view 1300, the form 154 may comprise three dynamic form prompts 160-1, 160-2 and 160-3. However, rather than use custom content 404 for a geographic location of USA that utilizes the English language, the form 154 uses custom content 404 for a geographic location of France that utilizes the French language. As shown in the GUI view 1300, the form 154 may comprise a dynamic form prompt 160-1 with a localized text string "Votre nom?" to prompt a user to enter her name into a form field 156-1. The form 154 may comprise a dynamic form prompt 160-2 with a localized text string "Votre adresse?" to prompt a user to enter her address into a form field 156-2. The form 154 may comprise a dynamic form prompt 160-3 with a localized text string "Votre ville?" to prompt a user to enter her city into a form field 156-3. Similarly, localized text strings in the French language are provided for the custom prompt descriptions 1304-1, 1304-2, and 1304-3. Once the user enters her information, the user may select the control button 1302 labeled "OK" to complete the form 154.

FIG. 15 illustrates an embodiment of an XML document 1500 for the custom form generation system 100. The XML document 1500 is an example of persistence XML generated from a prompt group of the three dynamic form prompts 160-1, 160-2 and 160-3 as shown in FIGS. 13, 14 to show that keys are stored instead of multiple instances of human-readable text associated with various locales. For example, a XML code portion 1502 may correspond to dynamic form prompt 160-1, a XML code portion 1504 may correspond to dynamic form prompt 160-2, and a XML code portion 1506 may correspond to dynamic form prompt 160-3. In this case a locale stored with the key is ignored at run-time.

FIG. 16 illustrates an embodiment of exemplary custom language interface 230 for the custom form generation system 100. The illustrated embodiment shown in FIG. 16 shows exemplary computer program code suitable for implementing a custom language interface 230. As shown, the custom language interface 230 is coded in the Java programming language, although other languages can be used as well.

The custom language interface 230 as shown in FIG. 16 is an implementation of a ResourceBundleDele gate interface that supports a prompt group of the three dynamic form prompts 160-1, 160-2 and 160-3 as shown in FIGS. 13, 14. As indicated in FIG. 16, a code portion 1602 is designed to return localized for the text custom form prompt 160-1, a code portion 1604 is designed to return localized text for the custom form prompt 160-2, and a code portion 1606 is designed to return localized text for the custom form prompt 160-3. A code portion 1608 may call a destroy method to clean-up and release resources.

Figure 17:
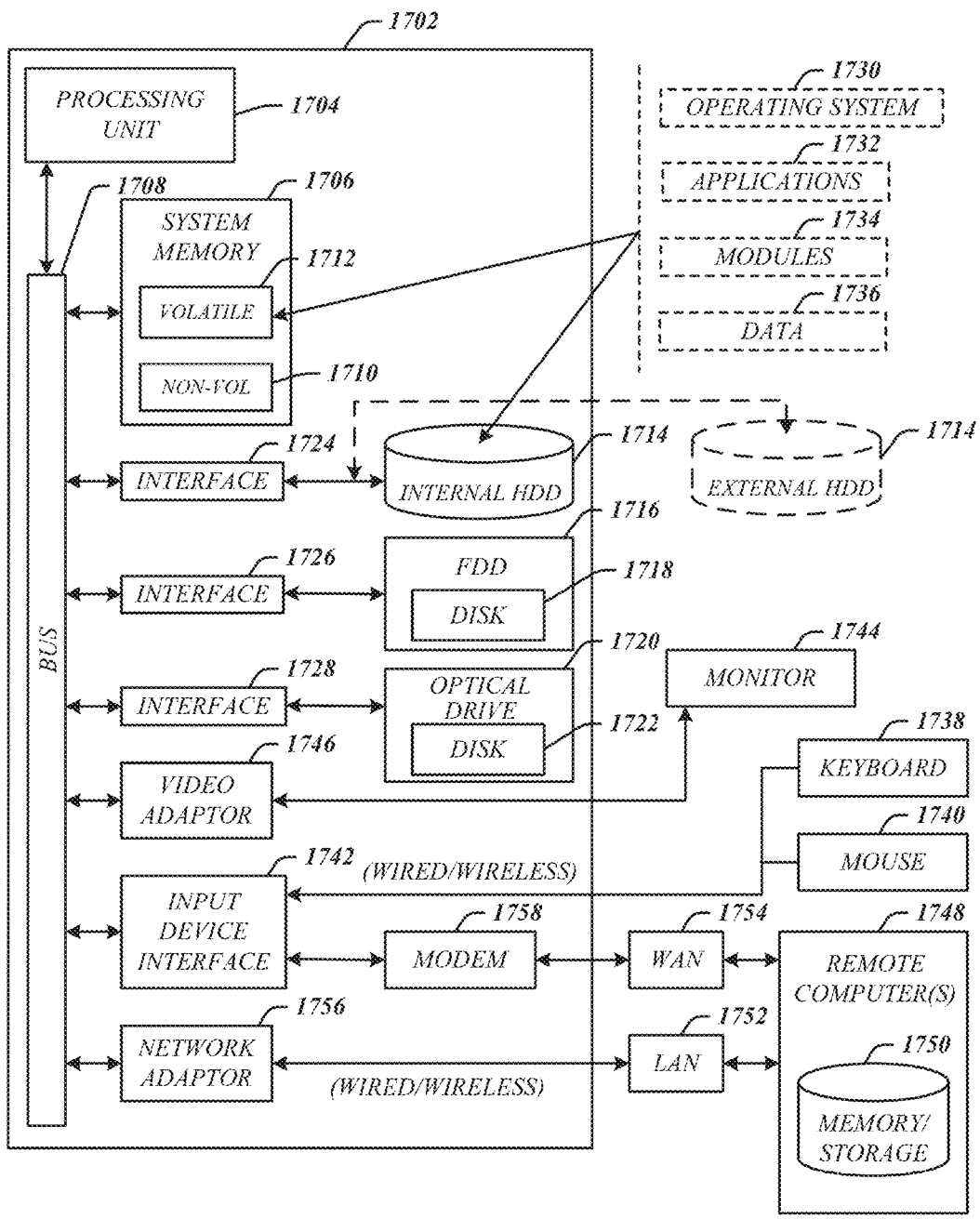
FIG. 17 illustrates an embodiment of a computing architecture.

FIG. 17 illustrates an embodiment of an exemplary computing architecture 1700 suitable for implementing various embodiments as previously described, such as the custom form generation system 100, for example. The computing architecture 1700 includes various common computing elements, such as one or more processors, co-processors, memory units, chipsets, controllers, peripherals, interfaces, oscillators, timing devices, video cards, audio cards, multimedia input/output (I/O) components, and so forth. The embodiments, however, are not limited to implementation by the computing architecture 1700.

As shown in FIG. 17, the computing architecture 1700 comprises a processing unit 1704, a system memory 1706 and a system bus 1708. The processing unit 1704 can be any of various commercially available processors. Dual microprocessors and other multi-processor architectures may also be employed as the processing unit 1704. The system bus 1708 provides an interface for system components including, but not limited to, the system memory 1706 to the processing unit 1704. The system bus 1708 can be any of several types of bus structure that may further interconnect to a memory bus (with or without a memory controller), a peripheral bus, and a local bus using any of a variety of commercially available bus architectures.

The system memory 1706 may include various types of memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. In the illustrated embodiment shown in FIG. 17, the system memory 1706 can include non-volatile memory 1710 and/or volatile memory 1712. A basic input/output system (BIOS) can be stored in the non-volatile memory 1710.

The computer 1702 may include various types of computer-readable storage media, including an internal hard disk drive (HDD) 1714, a magnetic floppy disk drive (FDD) 1716 to read from or write to a removable magnetic disk 1718, and an optical disk drive 1720 to read from or write to a removable optical disk 1722 (e.g., a CD-ROM or DVD). The HDD 1714, FDD 1716 and optical disk drive 1720 can be connected to the system bus 1708 by a HDD interface 1724, an FDD interface 1726 and an optical drive interface 1728, respectively. The HDD interface 1724 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1710, 1712, including an operating system 1730, one or more application programs 1732, other program modules 1734, and program data 1736. The one or more application programs 1732, other program modules 1734, and program data 1736 can include, for example, the dynamic form system 100, the IPC component 140, the remote event bridge 130, and other software elements described with the embodiments.

A user can enter commands and information into the computer 1702 through one or more wire/wireless input devices, for example, a keyboard 1738 and a pointing device, such as a mouse 1740. Other input devices may include a microphone, an infra-red (IR) remote control, a joystick, a game pad, a stylus pen, touch screen, or the like. These and other input devices are often connected to the processing unit 1704 through an input device interface 1742 that is coupled to the system bus 1708, but can be connected by other interfaces such as a parallel port, IEEE 1394 serial port, a game port, a USB port, an IR interface, and so forth.

A monitor 1744 or other type of display device is also connected to the system bus 1708 via an interface, such as a video adapter 1746. In addition to the monitor 1744, a computer typically includes other peripheral output devices, such as speakers, printers, and so forth.

The computer 1702 may operate in a networked environment using logical connections via wire and/or wireless communications to one or more remote computers, such as a remote computer 1748. The remote computer 1748 can be a workstation, a server computer, a router, a personal computer, portable computer, microprocessor-based entertainment appliance, a peer device or other common network node, and typically includes many or all of the elements described relative to the computer 1702, although, for purposes of brevity, only a memory/storage device 1750 is illustrated. The logical connections depicted include wire/wireless connectivity to a local area network (LAN) 1752 and/or larger networks, for example, a wide area network (WAN) 1754. Such LAN and WAN networking environments are commonplace in offices and companies, and facilitate enterprise-wide computer networks, such as intranets, all of which may connect to a global communications network, for example, the Internet.

When used in a LAN networking environment, the computer 1702 is connected to the LAN 1752 through a wire and/or wireless communication network interface or adapter 1756. The adapter 1756 can facilitate wire and/or wireless communications to the LAN 1752, which may also include a wireless access point disposed thereon for communicating with the wireless functionality of the adapter 1756.

When used in a WAN networking environment, the computer 1702 can include a modem 1758, or is connected to a communications server on the WAN 1754, or has other means for establishing communications over the WAN 1754, such as by way of the Internet. The modem 1758, which can be internal or external and a wire and/or wireless device, connects to the system bus 1708 via the input device interface 1742. In a networked environment, program modules depicted relative to the computer 1702, or portions thereof, can be stored in the remote memory/storage device 1750. It will be appreciated that the network connections shown are exemplary and other means of establishing a communications link between the computers can be used.

The computer 1702 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 18:
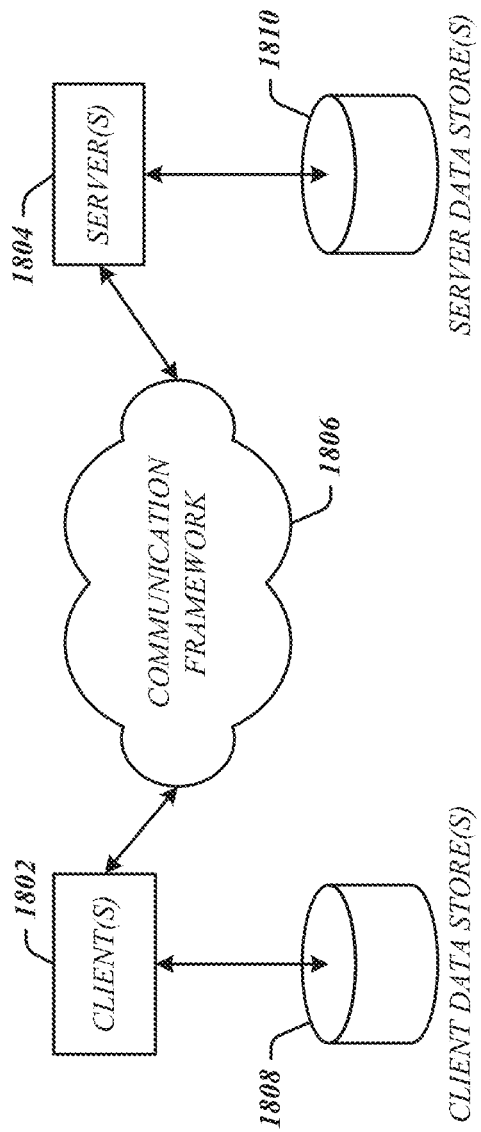
FIG. 18 illustrates an embodiment of a communications architecture.

FIG. 18 illustrates a block diagram of an exemplary communications architecture 1800 suitable for implementing various embodiments as previously described, such as the custom form generation system 100, particularly the network 130, for example. The communications architecture 1800 includes various common communications elements, such as a transmitter, receiver, transceiver, radio, network interface, baseband processor, antenna, amplifiers, filters, and so forth. The embodiments, however, are not limited to implementation by the communications architecture 1800.

As shown in FIG. 18, the communications architecture 1800 comprises includes one or more clients 1802 and servers 1804. The clients 1802 may comprise or implement the client devices 102, 1110. The servers 1804 may comprise or implement the server devices 104, 106, 1150. The clients 1802 and the servers 1804 are operatively connected to one or more respective client data stores 1808 and server data stores 1810 that can be employed to store information local to the respective clients 1802 and servers 1804, such as cookies and/or associated contextual information.

The clients 1802 and the servers 1804 may communicate information between each other using a communication framework 1806. The communications framework 1806 may implement any well-known communications techniques, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The clients 1802 and the servers 1804 may include various types of standard communication elements designed to be interoperable with the communications framework 1806, such as one or more communications interfaces, network interfaces, network interface cards (NIC), radios, wireless transmitters/receivers (transceivers), wired and/or wireless communication media, physical connectors, and so forth. By way of example, and not limitation, communication media includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media. One possible communication between a client 1802 and a server 1804 can be in the form of a data packet adapted to be transmitted between two or more computer processes. The data packet may include a cookie and/or associated contextual information, for example.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. An apparatus, comprising:
a logic device at least partially implemented in hardware; and
an application having a form manager component operative on the logic device to manage One or more forms for a user interface of the application during a run-time mode of the application, the form manner component having a custom prompt module operative to:
determine whether an application context interface is available for a dynamic form prompt of a new form of the one or more forms,
determine whether a custom language interface is available for the dynamic form prompt when the application context interface is available, and
retrieve custom content in a custom presentation language for the dynamic form prompt when the custom language interface is available, the application context interface operative to:
receive, from a first device over a network, a form prompt query for the new form, the form prompt query comprising a form prompt identifier and a location identifier, the form prompt identifier to uniquely identify the dynamic form prompt and the location identifier to uniquely identify a geographic location,
determine a previous delegate is set for a previous form of the one or more forms,
void, via a destroy method, the previous delegate used for the previous form,
set a new delegate to automatically retrieve, from a second device over the network, the custom content utilizing the form prompt identifier and the location identifier for the new form, the custom language interface to:
automatically retrieve, for the new form, the custom content in a custom presentation language for the dynamic form prompt from custom prompt information managed by a form information source, and
send a form prompt response with the custom content to a form viewer arranged to present the new form; and
the custom form prompt module to determine a user session has terminated for the new form, and release resources when the user session for the new form has terminated.

2. The apparatus of claim 1, the application context interface operative to establish an application context for the dynamic form prompt of the new form.

3. The apparatus of claim 1, the application context interface operative to receive the form prompt query from the form viewer arranged to present the new form.

4. The apparatus Of claim 1, the application context interface operative to void an application context for the new form when the user session for the form has terminated.

5. The apparatus of claim 1, the custom language interface operative to send a form prompt translation query to automatically retrieve the custom content from the custom prompt information stored by the form information source, and receive a form prompt translation response with the custom content from the form information source.

6. The apparatus of claim 1, the custom language interface operative to receive the form prompt identifier and the location identifier associated with the form prompt.

7. The apparatus of claim 1, the custom language interface operative to select the custom content in the custom presentation language for the dynamic form prompt from among multiple human languages based on the form prompt identifier and the location identifier.

8. The apparatus of claim 1, the custom Language interface operative to retrieve the custom content comprising a presentation string having one or more signs from a vocabulary of the custom presentation language.

9. The apparatus of claim 1, the custom language interface operative to retrieve the custom content from the form information source storing custom prompt information in a datastore.

10. The apparatus of claim 1, the custom language interface operative to retrieve the custom content from the form information source storing custom prompt information in a local datastore.

11. The apparatus of claim 1, the custom language interface operative to retrieve the custom content from the form information source storing custom prompt information in a remote datastore.

12. The apparatus of claim 1, comprising the form viewer and a digital display, the form viewer arranged to present the new form and the dynamic form prompt in a user interface view on the digital display.

13. The apparatus of claim 1, comprising the form viewer operative on the logic device to present the new form and the dynamic form prompt on a digital display.

14. The apparatus of claim 1, comprising the form viewer operative on a different logic device to present the new form and the dynamic form prompt on a digital display.

15. The apparatus of claim 1, the application context interface operative to void the new delegate for the new form and set a different delegate for a different form or a different dynamic form prompt.

16. A computer-implemented method, comprising:
determining whether an application context interface is available for dynamic form prompt of a new form;
determining whether a custom language interface is available for the application context interface;
receiving, by a processor circuit from a first device over a network, a request for custom content for a dynamic form prompt of the new form, the request comprising a form prompt query for the new form, the form prompt query further comprising a form prompt identifier and a location identifier, the form prompt identifier to uniquely identify the dynamic form prompt, and the location identifier to uniquely identify a geographic location;
determining a previous delegate is set for a previous forms
voiding, via a destroy method, the previous delegate used for the previous form;
setting a new delegate to automatically retrieve, from a second device over the network, the custom content utilizing the form prompt identifier and the location identifier for the new form;
automatically retrieving. for the new form, the custom content in a custom presentation language for the dynamic form prompt from custom prompt information managed by a form information source using the new delegate;
presenting the dynamic form prompt with the custom content in the custom presentation language in the new form on an electronic display;
determining a user session has terminated for the new form, and
releasing resources used by the application context interface and the custom language interface when a user session for the new form has terminated.

17. The computer-implemented method of claim 16, comprising retrieving the custom content in the custom presentation language for the dynamic. form prompt using the form prompt identifier and the location identifier, the custom content in one of multiple custom presentation languages stored with the custom prompt information.

18. The computer-implemented method of claim 16, comprising retrieving custom content comprising a presentation string having one or more signs from a vocabulary in the custom presentation language from custom prompt information.

19. The computer-implemented method of claim 16, comprising presenting the dynamic form prompt with the custom content in the custom presentation language in the new form on the electronic display by a form viewer.

20. The computer-implemented method of claim 16, comprising presenting the dynamic form prompt with the custom content in the custom presentation language in the new form as a user interface view on the electronic display.

21. The computer-implemented method of claim 16, comprising presenting a static form prompt with static content in a static presentation language in the new form on the electronic display.

22. The method of claim 16, comprising:
voiding the new delegate for the new form: and
setting a different delegate for a different form or a different dynamic form prompt.

23. An article of manufacture comprising a non-transitory storage medium containing instructions that when executed enable a system to:
determine an application context interface is available for a dynamic form prompt of a new form;
determine a custom language interface is available for the dynamic form prompt of the electronic form;
receive, from a first device over a network, a form prompt query for the new form, the form prompt query comprising a form prompt identifier and a location identifier, the form prompt identifier to uniquely identify the dynamic form prompt, and the location identifier to uniquely identify a geographic location;
determine a previous delegate is set for a previous form;
void, via a destroy method, the previous delegate used for the previous form
set, by the custom language interface, a new delegate to automatically retrieve, from a second device over the network, custom content utilizing the form prompt identifier and the location identifier for the new form;
automatically retrieve, for the new form, the custom content in a custom presentation language for the dynamic form prompt from a form information source using the new delegate;
present the dynamic form prompt with the custom content in the custom presentation language in the new form on an electronic display;
determine a user session has terminated for the new form; and release resources used by the application context interface and the custom language interface when a user session for the new form has terminated.

24. The article of claim 23, further comprising instructions that when executed enable the system to select the custom content in the custom presentation language for the dynamic form prompt from among multiple human languages based on the form prompt identifier and the location identifier.

25. The article of claim 23, further comprising instructions that when executed enable the system to retrieve custom content comprising a presentation string having one or more signs from a vocabulary of the custom presentation language.

26. The article of claim 23, further comprising instructions that when executed enable the system to present the new form and the dynamic form prompt with the custom content in the custom presentation language as a user interface view on an electronic display.

27. The article of claim 23 further comprising instructions that when executed enable the system to void the new delegate for the new form and set a different delegate for a different form or a different dynamic form prompt.

* * * * *

UNITED STATES PATENT AND TRADEMARK OFFICE
CERTIFICATE OF CORRECTION

PATENT NO. : 9,645,989 B2  
APPLICATION NO. : 13/289295  
DATED : May 9, 2017  
INVENTOR(S) : Todd C. Folsom and Scott Paul Leslie Page 1 of 1

It is certified that error appears in the above-identified patent and that said Letters Patent is hereby corrected as shown below:

In the Claims

Column 27, Line 8, replace "manner" with -- manager --

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*